US010824779B2

(12) United States Patent
Balabanov et al.

(10) Patent No.: US 10,824,779 B2
(45) Date of Patent: Nov. 3, 2020

(54) CONTROLLING AND ADJUSTING PLY SHAPES OF LAMINATED COMPOSITE STRUCTURES FOR PERFORMANCE AND MANUFACTURING CONSIDERATIONS

(71) Applicant: The Boeing Company, Chicago, IL (US)

(72) Inventors: Vladimir Balabanov, Mukilteo, WA (US); Mostafa Rassaian, Bellevue, WA (US); Zachary Robert Meves, Houston, TX (US); Yuan-Jye Wu, Issaquah, WA (US)

(73) Assignee: The Boeing Company, Chicago, IL (US)

( * ) Notice: Subject to any disclaimer, the term of this patent is extended or adjusted under 35 U.S.C. 154(b) by 327 days.

(21) Appl. No.: 15/471,486

(22) Filed: Mar. 28, 2017

(65) Prior Publication Data

US 2018/0285498 A1    Oct. 4, 2018

(51) Int. Cl.
| | |
|---|---|
| *G06F 17/50* | (2006.01) |
| *G06F 30/23* | (2020.01) |
| *B29C 70/38* | (2006.01) |
| B29L 31/30 | (2006.01) |
| G06F 113/24 | (2020.01) |
| G06F 119/18 | (2020.01) |
| G06F 113/26 | (2020.01) |

(52) U.S. Cl.
CPC .............. *G06F 30/23* (2020.01); *B29C 70/38* (2013.01); *B29L 2031/3076* (2013.01); *G06F 2113/24* (2020.01); *G06F 2113/26* (2020.01); *G06F 2119/18* (2020.01)

(58) Field of Classification Search
CPC ............. G06F 17/5018; G06F 2113/24; G06F 2113/26; G06F 30/15
See application file for complete search history.

(56) References Cited

U.S. PATENT DOCUMENTS

| | | | |
|---|---|---|---|
| 7,010,472 B1 * | 3/2006 | Vasey-Glandon | G06F 17/50 700/97 |
| 9,697,326 B1 * | 7/2017 | Bowman | G06F 17/5086 |
| 9,996,634 B2 * | 6/2018 | MacLean | G06F 30/00 |

(Continued)

OTHER PUBLICATIONS

"Optimization of Composite Structures," Altair Engineering, Inc., HyperWorks Solvers, Release 14.0.230, Copyright 1996-2016, 7 pages. http://www.altairhyperworks.com/hwhelp/Altair/hw14.0/help/hwsolvers/hwsolvers.htm?opt_of_composite_structures.htm, accessed Mar. 27, 2017.

*Primary Examiner* — Scott W Dodds
(74) *Attorney, Agent, or Firm* — Yee & Associates, P.C.

(57) ABSTRACT

A system comprises a model generation system and an analyzer. The model generation system is configured to modify a model of a laminated composite structure to meet a user defined objective and to meet at least one of user defined performance constraints or user defined manufacturing constraints by changing at least one ply characteristic of at least one ply of the model while maintaining ply boundary geometry constraints for each ply of the model. The ply boundary geometry constraints of the model generation system include a number of defined ply boundary geometries each described by a respective mathematical function. The analyzer is configured to return objective values or constraint function values for at least one ply of the model.

20 Claims, 15 Drawing Sheets

(56) References Cited

U.S. PATENT DOCUMENTS

2010/0204815 A1* 8/2010 Murrish ............ G05B 19/4097
 700/98
2017/0017740 A1* 1/2017 Arnold .................... G06F 30/23
2017/0057666 A1* 3/2017 Blom ...................... G06F 30/15

* cited by examiner

CONTROLLING AND ADJUSTING PLY SHAPES OF LAMINATED COMPOSITE STRUCTURES FOR PERFORMANCE AND MANUFACTURING CONSIDERATIONS

BACKGROUND INFORMATION

1. Field

The present disclosure relates generally to laminated composite structures, and more specifically, to controlling and adjusting ply shapes of laminated composite structures. Still more particularly, the present disclosure relates to controlling and adjusting ply shapes of a laminated composite structure for quantifiable criteria of the laminated composite structure.

2. Background

Arrangement and ply shapes of laminated composite structures affects manufacturability, laminate performance, weight, and cost for the laminated composite parts. For example, complex ply shapes may be more difficult or time consuming to manufacture than simple ply shapes.

Conventional design processes for laminated composite structures may be performed manually or using a finite element analysis. However, existing design processes may be more time consuming than desired or less controlled than desired. For example, manual manipulation of the ply shapes may be more time consuming than desired. Manual manipulation of the ply shapes also relies on engineering judgment to create a composite structure with desired performance characteristics.

A conventional finite element based analysis accounts for limited predefined objectives and constraints. For example, one conventional finite element based analysis accounts for stiffness of the composite structure only.

A conventional finite element based analysis does not take into account manufacturability, efficiency, cost, or other performance characteristics.

Additionally, there may be limited control over the resulting ply geometries. A conventional finite element based analysis may produce plies with irregular shapes.

As a result, manual adjustments to the ply design may be applied to the results of a conventional finite element based analysis. For example, an engineer may alter a ply shape from a finite element based analysis to a more regular shape, such as a rectangular shape, for manufacturability reasons. Therefore, for these reasons, it would be desirable to have a method and apparatus that takes into account at least some of the issues discussed above, as well as other possible issues.

SUMMARY

An illustrative embodiment of the present disclosure provides a model generation system and an analyzer. The model generation system is configured to modify a model of a laminated composite structure to meet a user defined objective and to meet at least one of user defined performance constraints or user defined manufacturing constraints by changing at least one ply characteristic of at least one ply of the model while maintaining ply boundary geometry constraints for each ply of the model. The ply boundary geometry constraints of the model generation system include a number of defined ply boundary geometries, each described by a respective mathematical function. The analyzer is configured to return objective values or constraint function values for at least one ply of the model.

Another illustrative embodiment of the present disclosure provides a method. A model of a laminated composite structure is obtained by a computer system. The model of the laminated composite structure is modified by the computer system to meet a user defined objective and to meet at least one of user defined performance constraints or user defined manufacturing constraints by changing at least one ply characteristic of at least one ply of the model while maintaining ply boundary geometry constraints for each ply of the model, wherein the ply boundary geometry constraints of the model generation system include a number of defined ply boundary geometries, each described by a respective mathematical function, and wherein modifying the model forms a modified model.

A further illustrative embodiment of the present disclosure provides a method. An input model of a laminated composite structure is obtained, wherein the input model has a plurality of plies. Ply boundary geometry constraints are applied to each of the plurality of plies to form a modified input model. A ply characteristic of at least one ply of the plurality of plies of the modified input model is changed to form a modified model, wherein changing the ply characteristic does not modify the ply boundary geometry constraints of the plurality of plies, and wherein the ply characteristic is changed such that a user specified objective is optimized. The laminated composite structure is laid up based on the modified model.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The different illustrative embodiments recognize and take into account one or more different considerations. For example, the illustrative embodiments recognize and take into account that it would be desirable to have a modeling program configured to design laminated composite structures while taking into account manufacturability, cost, and performance.

The different illustrative embodiments recognize and take into account that it may be desirable to use commercial structural analysis, in combination with a modeling program, for optimization to design laminated composite structures. The different illustrative embodiments recognize and take into account that leveraging commercial structural analysis tools may lower design costs.

The different illustrative embodiments also recognize and take into account that it would be desirable to have a modular program configured to automate the procedure of structural analysis and optimization. The different illustrative embodiments additionally recognize and take into account that desired ply arrangement and ply shapes of laminated composite structures provide at least one of better manufacturability, improved laminate performance, reduced weight, or considerable cost savings for composite parts. The composite parts may include airplane components, such as an airplane wing, a fuselage, or any other type of composite airplane component.

The different illustrative embodiments recognize and take into account that it would be desirable to provide a means for a designer/engineer to explicitly and automatically control and adjust the shape of the plies in laminated structures. The illustrative embodiments recognize and take into account that it would be desirable for automatic ply shape adjustments to be made according to any quantifiable criteria for composite laminated structures, such as stress, buckling load, manufacturing cost, length of ply boundary, etc. The illustrative embodiments recognize and take into account that it may be desirable to have a modular program that can be implemented in any commercial finite element code for composites ply shape optimization.

Figure 1:
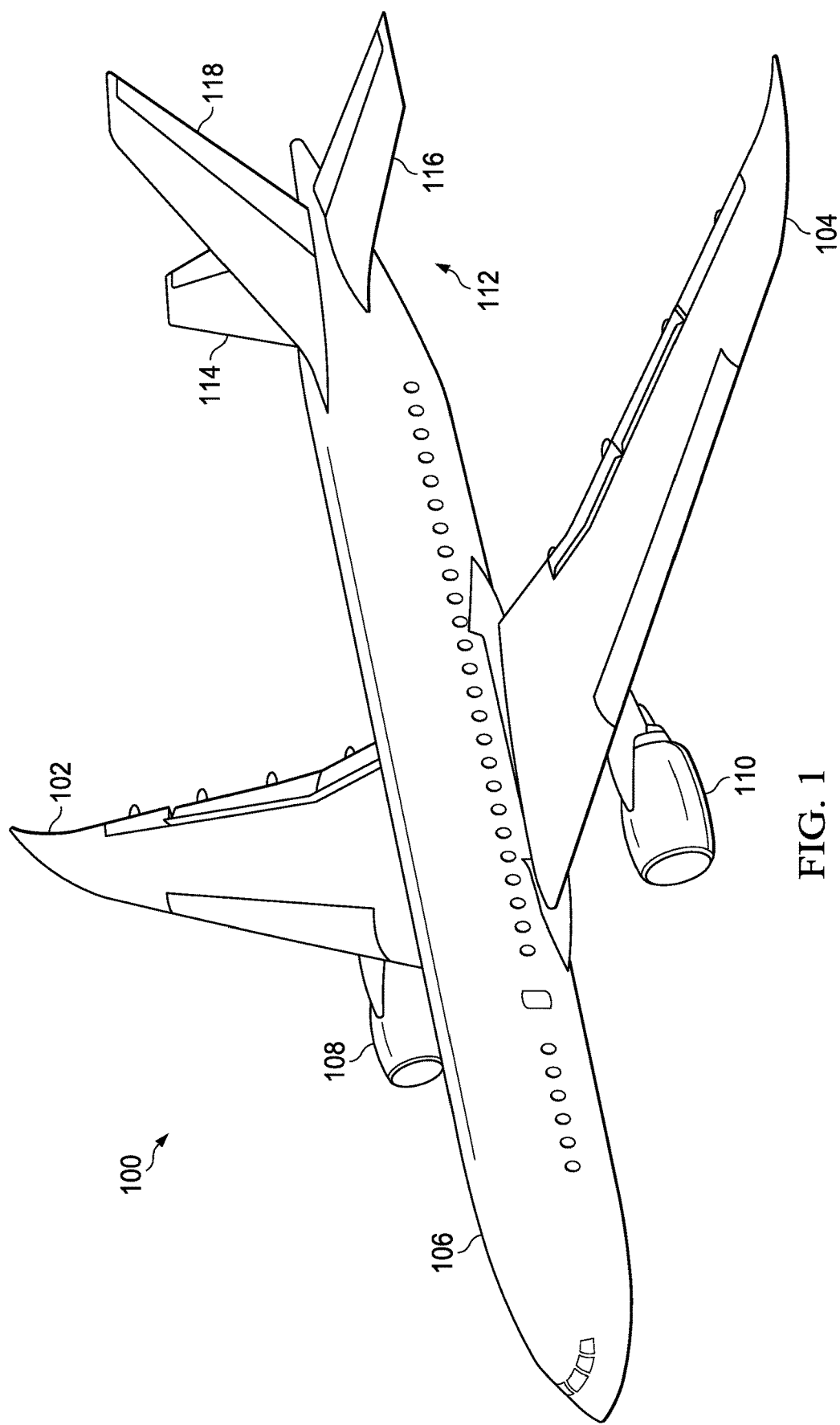
FIG. 1 is an illustration of an aircraft in which an illustrative embodiment may be implemented.

Referring now to the figures and, in particular, with reference to FIG. 1, an illustration of an aircraft is depicted in which an illustrative embodiment may be implemented. In this illustrative example, aircraft 100 has wing 102 and wing 104 connected to body 106. Aircraft 100 includes engine 108 connected to wing 102 and engine 110 connected to wing 104.

Body 106 has tail section 112. Horizontal stabilizer 114, horizontal stabilizer 116, and vertical stabilizer 118 are connected to tail section 112 of body 106.

Aircraft 100 is an example of an aircraft having laminated composite structures designed using the illustrative embodiments. For example, body 106 or a portion of body 106 may be a laminated composite structure designed according to the illustrative embodiments. As another example, wing 102 or wing 104 of aircraft 100 may include a laminated composite structure designed according to the illustrative embodiments.

This illustration of aircraft 100 is provided for purposes of illustrating one environment in which the different illustrative embodiments may be implemented. The illustration of aircraft 100 in FIG. 1 is not meant to imply architectural limitations as to the manner in which different illustrative embodiments may be implemented. For example, aircraft 100 is shown as a commercial passenger aircraft. The different illustrative embodiments may be applied to other types of aircraft, such as a private passenger aircraft, a rotorcraft, or other suitable types of aircraft.

Although the illustrative examples for an illustrative embodiment are described with respect to an aircraft, the illustrative embodiments may be applied to other types of structures. The structure may be, for example, a mobile structure, a stationary structure, a land-based structure, an aquatic-based structure, or a space-based structure. More specifically, the structure may be a surface ship, a tank, a personnel carrier, a train, a spacecraft, a space station, a satellite, a submarine, a manufacturing facility, a building, or other suitable structures.

Figure 2:
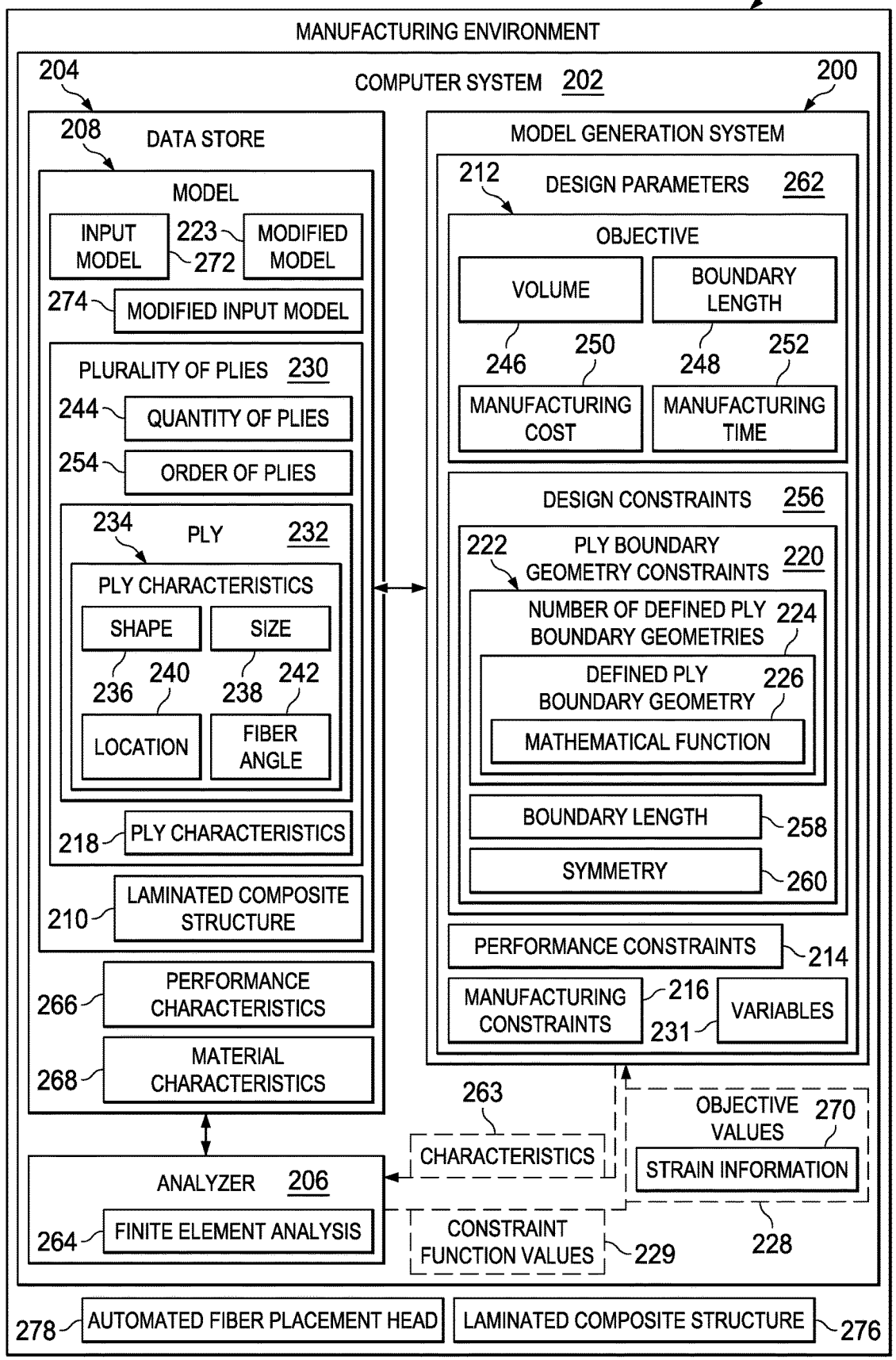
FIG. 2 is an illustration of a block diagram of a model generation system in accordance with an illustrative embodiment.

Turning now to FIG. 2, an illustration of a block diagram of a model generation system is depicted in accordance with an illustrative embodiment. In this illustrative example, model generation system 200 may be an example of a system that may be used to generate a layout for a component of aircraft 100. For example, model generation system 200 may be used to generate a layout for at least a portion of body 106.

Model generation system 200 may optimize a composite laminate structure for manufacturability, cost, and performance. The optimization may use commercial structural analysis and optimization tools in conjunction with a modular program to automate this procedure. In some examples, the program may be MATLAB-based. In FIG. 2, model generation system 200 is the modular program to automate the procedure.

In this illustrative example, model generation system 200 may be implemented in software, hardware, firmware, or a combination thereof. When software is used, the operations performed by model generation system 200 may be implemented using, for example, without limitation, program code configured to run on a processor unit. When firmware is used, the operations performed by model generation system 200 may be implemented using, for example, without limitation, program code and data and stored in a persistent memory to run on a processor unit.

When hardware is employed, the hardware may include one or more circuits that operate to perform the operations performed by model generation system 200. Depending on the implementation, the hardware may take the form of a circuit system, an integrated circuit, an application specific integrated circuit (ASIC), a programmable logic device, or some other suitable type of hardware device configured to perform any number of operations.

A programmable logic device may be configured to perform certain operations. The device may be permanently configured to perform these operations or may be reconfigurable. A programmable logic device may take the form of, for example, without limitation, a programmable logic array, a programmable array logic, a field programmable logic array, a field programmable gate array, or some other type of programmable hardware device.

In some illustrative examples, the operations and processes performed by model generation system 200 may be performed using organic components integrated with inorganic components. In some cases, the operations and processes may be performed by entirely organic components, excluding a human being. As one illustrative example, circuits in organic semiconductors may be used to perform these operations and processes.

As depicted in this example, model generation system 200 may be implemented in computer system 202. Computer system 202 may be comprised of one or more computers that may be in communication with each other.

Computer system 202 may include data store 204 and analyzer 206. Depending on the implementation, analyzer 206 may be implemented using hardware, software, firmware, or a combination thereof.

In some non-limiting examples, analyzer 206 may use commercial software, such as OptiStruct for analysis. However, analyzer 206 can use other finite element programs if desired.

Model generation system 200 and analyzer 206 may be configured to access and interact with data store 204. Data store 204 may be comprised of at least one of a database, a data repository, a file, a flat file, a spreadsheet, a file system, an email storage system, or some other type of data storage.

As used herein, the phrase "at least one of," when used with a list of items, means different combinations of one or more of the listed items may be used and only one of the items in the list may be needed. The item may be a particular object, a thing, an action, a process, or a category. In other words, "at least one of" means any combination of items or number of items may be used from the list, but not all of the items in the list may be required.

For example, "at least one of item A, item B, or item C" or "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Model generation system 200 is configured to modify model 208 of laminated composite structure 210 to meet user-defined objective 212 and to meet at least one of user-defined performance constraints 214 or user defined manufacturing constraints 216 by changing at least one ply characteristic of at least one ply of model 208 while maintaining ply boundary geometry constraints 220 for each ply of model 208, wherein ply boundary geometry constraints 220 of model generation system 200 include number of defined ply boundary geometries 222, each described by a respective mathematical function. Modifying model 208 forms modified model 223. Analyzer 206 is configured to return objective values 228 or constraint function values 229, for at least one ply of model 208. In some illustrative examples, at least one ply characteristic is selected from at least one of a fiber angle, a ply location, or a ply size.

Laminated composite structure 210 may be any desirable type of part and have any desirable shape. Laminated composite structure 210 may have a curved surface, a flat surface, a double-curved surface, a complex curvature, or any other desirable shape of surface. Model 208 for laminated composite structure 210 may be modified for any type of part as long as each ply that is modified has a ply boundary of ply boundary geometries 222 described by a respective mathematical function.

In changing at least one ply characteristic of at least one ply of model 208, one or more of ply characteristics 218 of plurality of plies 230 is changed. In one illustrative example, one ply characteristic of one ply of model 208 is changed. For example, a size of one ply of model 208 may be changed. In another illustrative example, more than one ply characteristic of one ply of model 208 is changed. For example, a size and location of the one ply of model 208 may be changed.

In yet another illustrative example, a ply characteristic of multiple plies is changed. For example, the size of multiple plies of model 208 may be changed. In a further illustrative example, multiple ply characteristics of multiple plies are changed. For example, a size and a shape of multiple plies may be changed.

Ply boundary geometry constraints 220 control the shape of each of plurality of plies 230 of model 208. Number of defined ply boundary geometries 222 includes acceptable ply shapes. In one illustrative example, number of defined ply boundary geometries 222 includes defined ply boundary geometry 224 described by mathematical function 226. In one illustrative example, mathematical function 226 may describe a rectangular shape. In this illustrative example, number of defined ply boundary geometries 222 includes a rectangular shape.

By maintaining ply boundary geometry constraints 220, the ply shapes of plurality of plies 230 are controlled for manufacturing considerations. Number of defined ply boundary geometries 222 may be operator identified ply shapes that have an acceptable ease of manufacture. In some illustrative examples, number of defined ply boundary geometries 222 includes at least one of a rectangle, an ellipse, an oval, a spline, or a triangle.

While maintaining ply boundary geometry constraints 220, the ply shapes of plurality of plies 230 are adjusted. The ply shapes may be adjusted by changing at least one ply characteristic of at least one ply of model 208. Variables 231 are those ply characteristics of ply characteristics 218 that may be changed by model generation system 200. Variables 231 may be set by a user. In some illustrative examples, variables 231 may be set on a ply-by-ply basis. In other illustrative examples, variables 231 may be set uniformly across model 208.

Ply 232 of plurality of plies 230 includes ply characteristics 234. Ply characteristics 234 are a subset of ply characteristics 218 for ply 232. Ply characteristics 234 include shape 236, size 238, location 240, and fiber angle 242. Any of ply characteristics 234 may be changed to change ply 232. Ply characteristics 234 that may be changed are set as variables 231.

In some illustrative examples, all of ply characteristics 234 are set as variables. In some illustrative examples, a number of ply characteristics 234 are set as unchangeable values. Shape 236 of ply 232 is one shape of number of defined ply boundary geometries 222. In the illustrative examples in which number of defined ply boundary geometries 222 includes more than one defined ply boundary geometry 224, shape 236 of ply 232 may be changed by model generation system 200.

As used herein, modifying ply characteristics 218 of model 208 changes at least one ply characteristic of at least one ply of plurality of plies 230. Prior to modifying model

208, ply characteristics of model 208 are identified that are variable. These ply characteristics are variables 231. Ply characteristics of model 208 are identified that are fixed. These fixed ply characteristics are not changed during the modification.

In some illustrative examples, all plies of plurality of plies 230 have variables 231. In these illustrative examples, all plies of plurality of plies 230 may be changed. In other illustrative examples, at least one ply of plurality of plies 230 may be fixed. In these illustrative examples, ply characteristics for a subset of plurality of plies 230 are fixed.

In some illustrative examples, quantity of plies 244 of plurality of plies 230 may be changed. Quantity of plies 244 may be changed by minimizing the size of at least one ply. For example, by setting size 238 of ply 232 to zero, ply 232 is removed from plurality of plies 230.

In some illustrative examples, changing quantity of plies 244 is performed to meet user-defined objective 212. In some illustrative examples, user-defined objective 212 includes minimizing at least one of volume 246, boundary length 248, manufacturing cost 250, or manufacturing time 252.

In some illustrative examples, model generation system 200 may change order of plies 254. Order of plies 254 may be changed to meet or optimize at least one of performance constraints 214 or manufacturing constraints 216. In some illustrative examples, performance constraints 214 include controlling at least one of a maximum strain, stability of the structure, resistance to strikes on the structure, maximum stress, far field stress, large notch failure load, structure stiffness, or structure strength. In some illustrative examples, manufacturing constraints 216 include at least one of a boundary length, a manufacturing cost, or a manufacturing time.

Model generation system 200 may have additional constraints other than ply boundary geometry constraints 220. For example, ply boundary geometry constraints 220 may be only some of design constraints 256. In some illustrative examples, design constraints 256 include boundary length 258. A boundary length may refer to a boundary length of a specific ply or a total boundary length of two or more plies. In some illustrative examples, boundary length 258 may be a maximum boundary length for a ply of plurality of plies 230. In other illustrative examples, boundary length 258 may be a maximum boundary length for plurality of plies 230.

In some illustrative examples, design constraints 256 include symmetry 260. When symmetry 260 is one of design constraints 256, each ply of plurality of plies 230 is symmetric about the center of laminated composite structure 210.

A user may set design parameters 262 for model generation system 200. Design parameters 262 include at least one of objective 212, design constraints 256, performance constraints 214, manufacturing constraints 216, and variables 231. By having user-set design parameters 262, model generation system 200 is responsive to user considerations.

After modifying ply characteristics 218 of model 208, model generation system 200 sends characteristics 263 of modified model 223 to analyzer 206. Analyzer 206 receives characteristics 263 of model 208 and returns at least one of objective values 228 or constraint function values 229 to model generation system 200. To generate at least one of objective values 228 or constraint function values 229, analyzer 206 may retrieve information from data store 204. In some illustrative examples, analyzer 206 performs finite element analysis 264 to produce at least one of objective values 228 or constraint function values 229.

Although analyzer 206 returns values to model generation system 200, model generation system 200 retains control over the geometry and optimization process. Model generation system 200 has explicit control over ply geometry, objectives, and constraints. Model generation system 200 also has the potential to optimize ply angles, in addition to ply shapes.

When ply fiber angles, such as fiber angle 242, are design variables, objective 212 may be to minimize fiber strain. Ply fiber angles have no effect on volume. Optimizing fiber angles, such as fiber angle 242, may be performed as a two-step optimization. For example, a first optimization may optimize fiber angle by minimizing strain in model 208. A second optimization may optimize ply size and ply location by minimizing volume 246 of model 208.

Algorithms within model generation system 200 use at least one of objective values 228 or constraint function values 229 to determine if the current iteration of model 208 meets design parameters 262. Analyzer 206 returns data used by model generation system 200 to determine when an optimization is complete.

Analyzer 206 may produce at least one of objective values 228 or constraint function values 229 using characteristics 263, performance characteristics 266, and material characteristics 268. Performance characteristics 266 and material characteristics 268 may include data related to materials and properties of each ply of plurality of plies 230. Performance characteristics 266 and material characteristics 268 may include data related to interactions between plies of plurality of plies 230. In some illustrative examples, objective values 228 include strain information 270.

Model generation system 200 modifies model 208 iteratively until modified model 223 meets design parameters 262. The closer the input sent to model generation system 200 is to meeting objective 212 and other design parameters 262, the fewer iterations are performed on model 208. Input to model generation system 200 may be manually created or be an output of a finite element analysis, such as analyzer 206.

Input to model generation system 200 takes the form of input model 272. In some illustrative examples, plies of input model 272 have irregular or undesirably complicated ply shapes. Prior to optimizing objective 212, ply boundary geometry constraints 220 are applied to input model 272. Applying ply boundary geometry constraints 220 modifies the ply shapes of input model 272 to form modified input model 274.

Modified input model 274 is the first entry provided to model generation system 200 to perform iterations to meet design parameters 262. In some illustrative examples, model 208 is a later iteration saved over modified input model 274. In other illustrative examples, model 208 is a separately saved iteration following modified input model 274.

After modified model 223 meets design parameters 262, modified model 223 may be used to form laminated composite structure 276. Automated fiber placement head 278 is present in manufacturing environment 280. Automated fiber placement head 278 is configured to form laminated composite structure 276 based on modified model 223.

Model generation system 200 represents all ply angles, thicknesses, and shapes with numerical arrays. Model generation system 200 uses analyzer 206 as an analysis tool to find the response of the software (such as MATLAB)-defined laminate structure.

Model generation system 200 optimizes by treating ply angles, locations, and sizes as design variables. Model generation system 200 exports the laminate structure to analyzer 206 and reads the analysis results (fiber strains) for constraint values.

Model generation system 200 may conduct a software-based optimization. Model generation system 200 provides flexibility in defining variables, objectives and constraints. Model generation system 200 controls volume and compliance as well as course length, number of plies, estimated manufacturing time, and other user-defined functions. Although conventional analyzers such as analyzer 206 may control volume and compliance, other characteristics are not controlled.

In the illustrative examples, analyzer 206 is used to find the objective values or constraint function values and has no effect on the optimization algorithms. Fiber stress/strain can always be used as a constraint.

A finite element model generated from numerical arrays specifies ply geometry. Element, node, and load case information are contained in a template finite element model. Model generation system 200 creates property cards for each element, specifying the ply angles and thicknesses present therein. Elemental ply thicknesses are set based on overlap between the ply shapes of plurality of plies 230 and finite element model.

If a ply of plurality of plies 230 overlaps a finite element, the ply thickness is applied or added to the thickness of the finite element. If a ply of plurality of plies 230 does not overlap the finite element, then the thickness of the finite element is not accounting for the ply. When a ply of plurality of plies 230 partially overlaps a finite element, a portion of the thickness equivalent to the fraction of the finite element covered by the ply is added to the finite element.

The illustration of model generation system 200 in FIG. 2 is not meant to imply physical or architectural limitations to the manner in which an illustrative embodiment may be implemented. Other components, in addition to or in place of the ones illustrated, may be used. Some components may be optional. Also, the blocks are presented to illustrate some functional components. One or more of these blocks may be combined, divided, or combined and divided into different blocks when implemented in an illustrative embodiment.

For example, although computer system 202 is depicted as present in manufacturing environment 280, in other illustrative examples, computer system 202 may be present outside of manufacturing environment 280. Further, although each of data store 204, model generation system 200, and analyzer 206 is depicted on computer system 202, in other illustrative examples at least one of data store 204, model generation system 200, or analyzer 206 is present on a separate computer system.

As another example, although not depicted, each of input model 272, modified input model 274, and modified model 223 include a plurality of plies. In some illustrative examples, input model 272, modified input model 274, and modified model 223 may be different versions of model 208. Each of input model 272, modified input model 274, and modified model 223 may be saved over each other as model generation system 200 performs modifications to the ply characteristics of the model.

As a further example, although not depicted, modified model 223 may be a first modified model. Modified model 223 may be further modified to meet a second user defined objective and to meet the at least one of the user defined performance constraints or the user defined manufacturing constraints by modifying at least one ply characteristic of at least one ply of modified model 223 while maintaining ply boundary geometry constraints for each ply of first modified model 223. Modifying modified model 223 may form a second modified model which is not depicted.

As another example, although not depicted, plurality of plies 230 may be divided into ply groupings. A group of plies may include any desirable quantity of plies. One design variable set (a, L, W, x, y)) may control characteristics of all plies in a group. In this illustrative design variable set, a is fiber orientation, L is ply height, W is ply width, and x and y are x- and y-coordinates of ply centroid correspondingly. All plies in a group have the same fiber orientation (a). Each ply grouping can have multiple identical plies and/or plies that are symmetric in the X-Y plane. Using ply groupings reduces computational complexity while providing specific control over desired geometry patterns.

Figure 3:
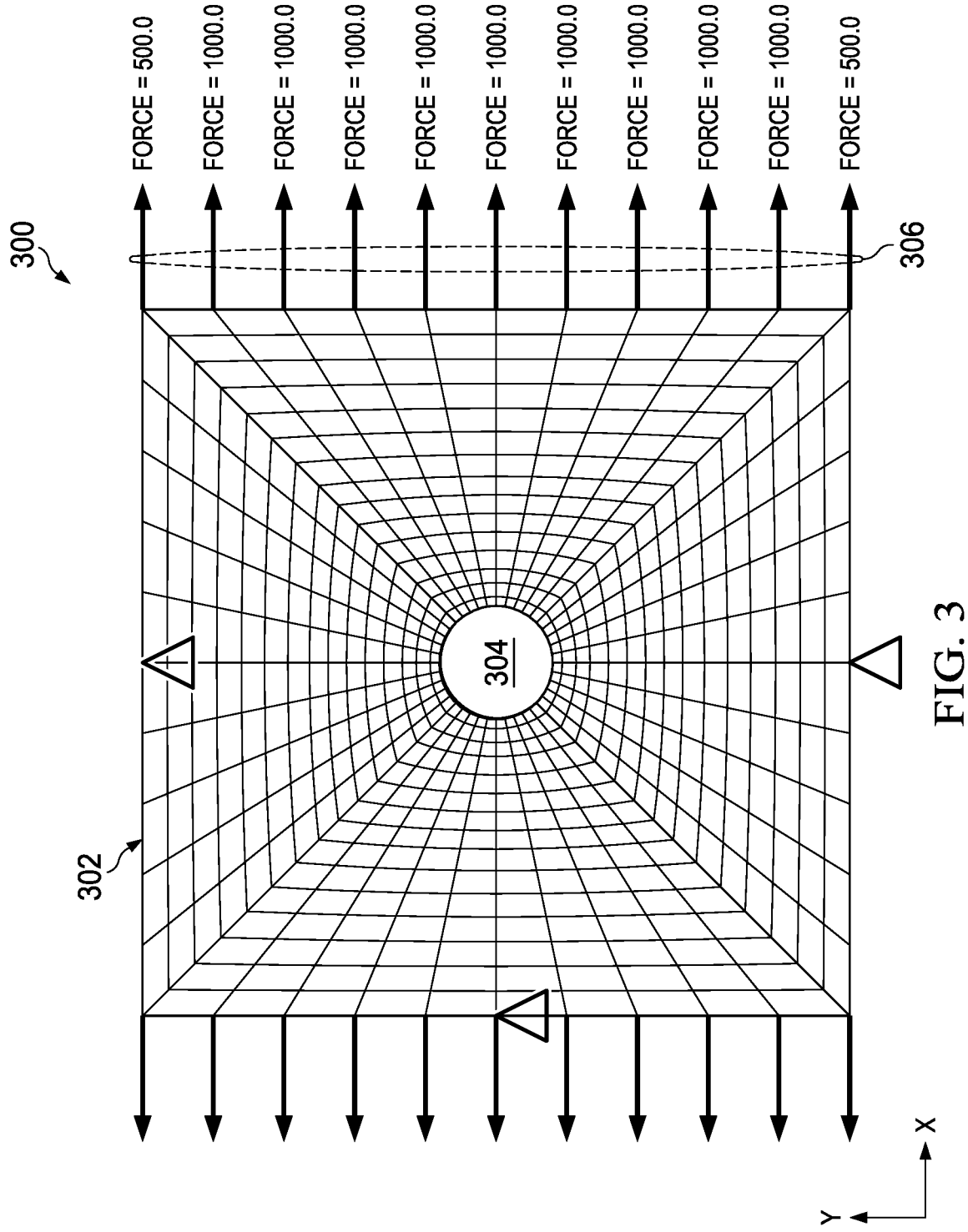
FIG. 3 is an illustration of a laminated composite structure in accordance with an illustrative embodiment.

Turning now to FIG. 3, an illustration of a laminated composite structure is depicted in accordance with an illustrative embodiment. Laminated composite structure 300 is an illustration of plate 302 with hole 304 in tension 306. Laminated composite structure 300 is an example of laminated composite structure 276 of FIG. 2.

It is desirable to create a layup for laminated composite structure 300 that optimizes user defined design parameters, such as design parameters 262 of FIG. 2 while meeting design constraints, such as design constraints 256 of FIG. 2. For example, a user may indicate minimizing manufacturing costs as a user defined design parameter while maintaining strain below a set value. As another example, a user may indicate minimizing volume as a user defined design parameter while maintaining geometry constraints and maintaining strain below a set value.

Figure 4:
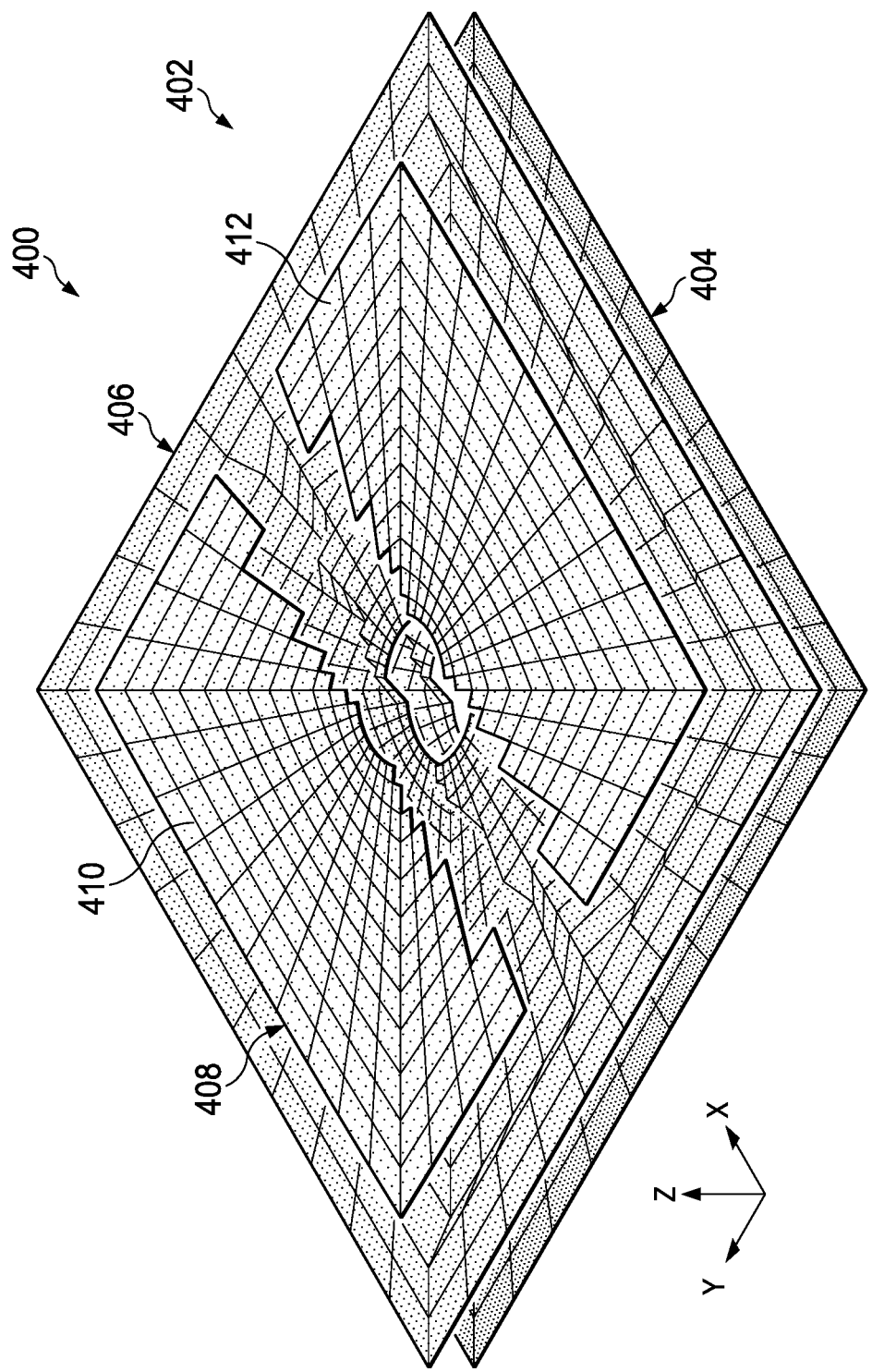
FIG. 4 is an illustration of an input model in accordance with an illustrative embodiment.

Turning now to FIG. 4, an illustration of an input model is depicted in accordance with an illustrative embodiment. Input model 400 is an implementation of input model 272 of FIG. 2. In some illustrative examples, input model 400 is manually generated by an operator based on the operator's experience and knowledge. In some illustrative examples, input model 400 is generated using a conventional finite element analysis.

Input model 400 is a model for laminated composite structure 300 of FIG. 3. Input model 400 has plurality of plies 402. Plurality of plies 402 includes ply 404, ply 406, and ply 408. Ply 408 includes patch 410 and patch 412. Patch 410 and patch 412 have the same fiber angle.

In some illustrative examples, more than one ply of plurality of plies 402 has the same fiber angle. In one example, ply 404 and ply 408 have the same fiber angle. In some other illustrative examples, each of ply 404, ply 406, and ply 408 each have different fiber angles.

As depicted, ply 406 and ply 408 have irregular geometries. For example, ply 406 and ply 408 cannot be described as a shape such as a rectangle, a triangle, a circle, an oval, a parallelogram, or other shape. Because of the irregular geometries of ply 406 and ply 408, manufacturing a laminated composite structure using input model 400 would be at least one of undesirably difficult, undesirably costly, or undesirably time consuming.

Further, input model 400 may not be optimized for desirable parameters. For example, at least one of a volume, a strain, a compliance, a course length, a quantity of plies, or other desirable parameters may not be a desirable value. Yet further, input model 400 may be designed to optimize a parameter other than a user desired parameter.

Figure 5A:
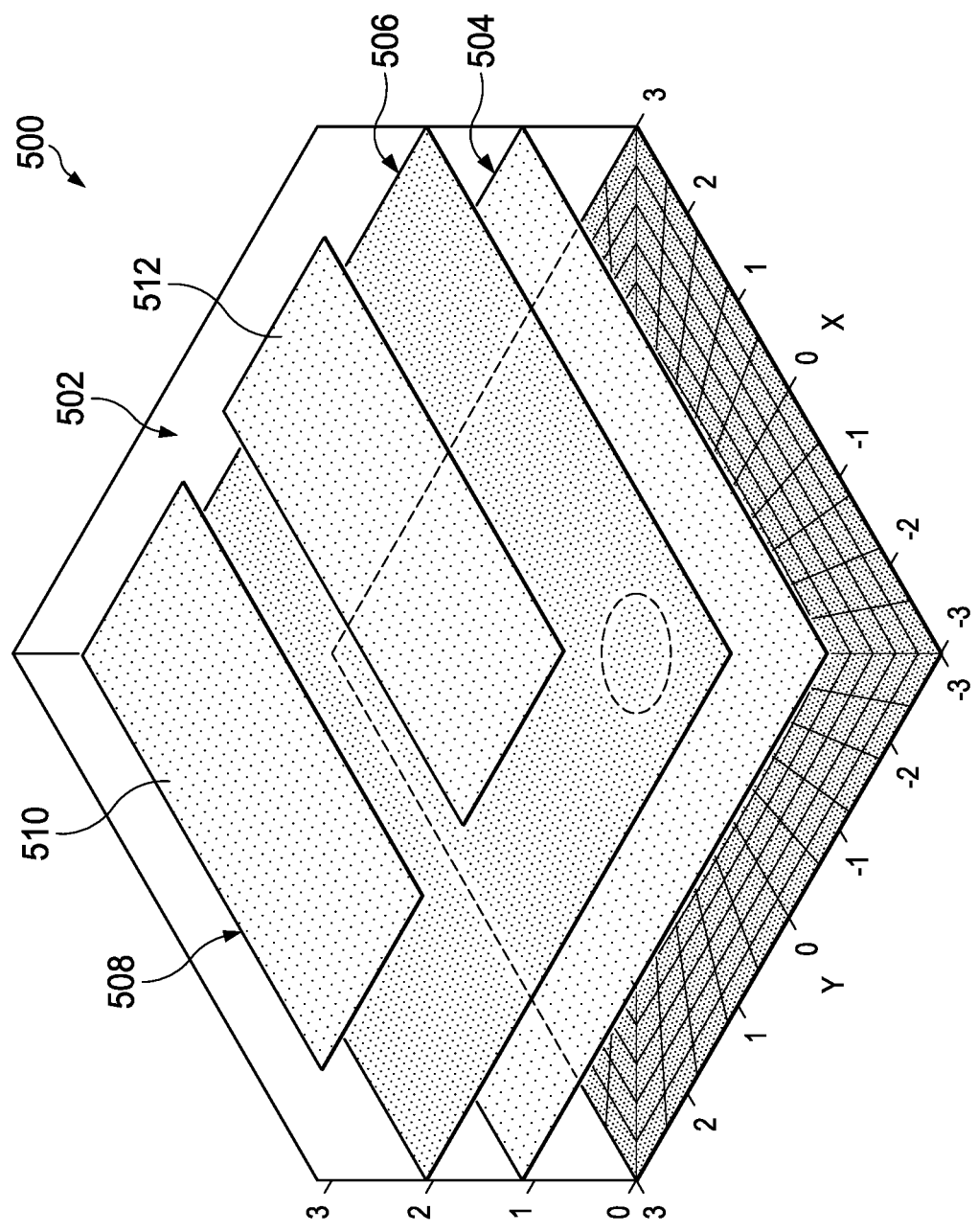
FIGS. 5A and 5B are an isometric view and a top view, respectively, of an input model modified for ply shape in accordance with an illustrative embodiment.
Figure 5B:
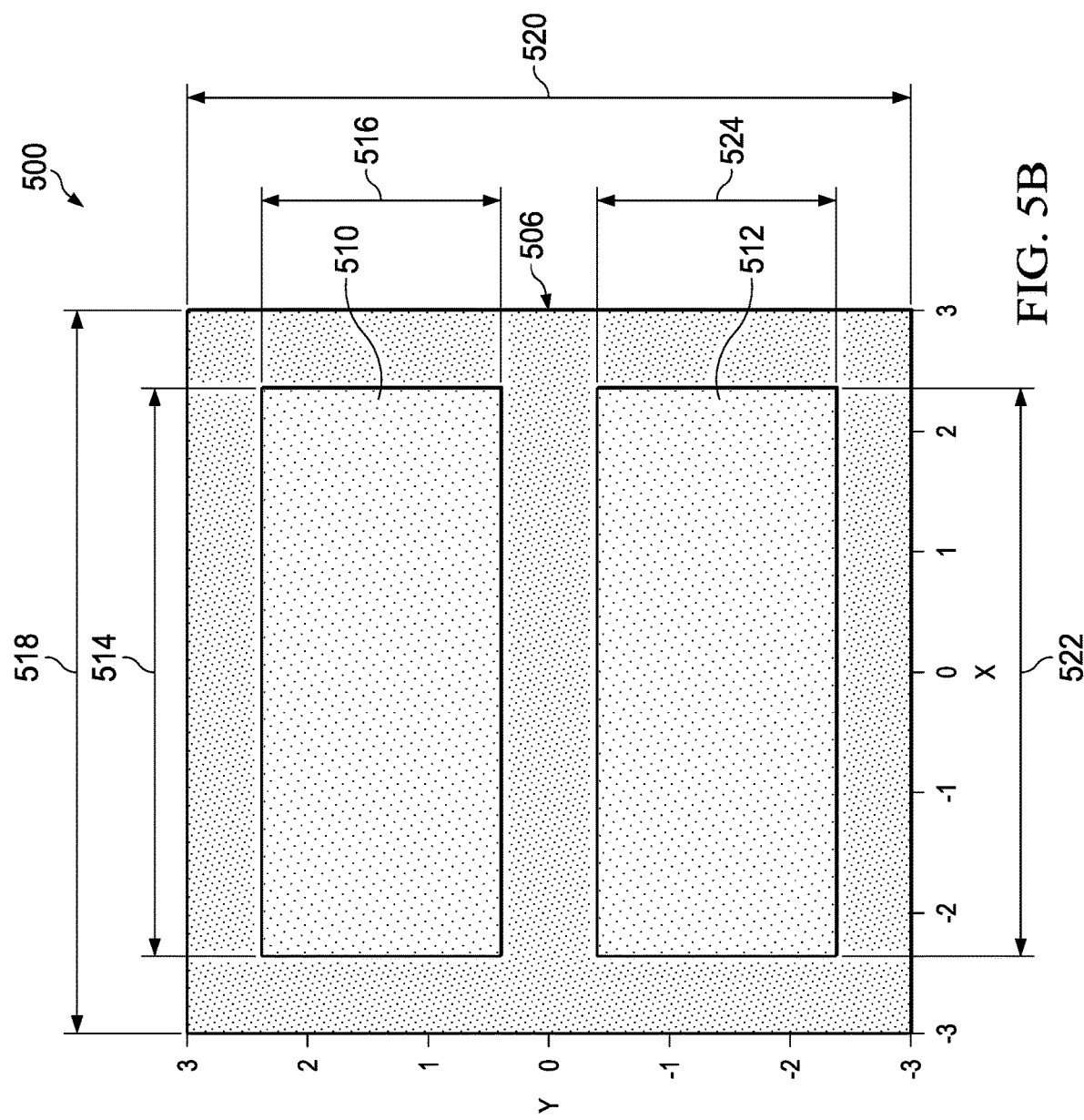

Turning now to FIGS. 5A and 5B, an isometric view and a top view, respectively, of the input model modified for ply shape are depicted in accordance with an illustrative embodiment. FIG. 5A is an isometric view of modified input model 500. Modified input model 500 is input model 400 modified for ply shape. As depicted, modified input model 500 is a model for laminated composite structure 300 of FIG. 3.

Modified input model 500 has plurality of plies 502. Plurality of plies 502 has the same quantity of plies as plurality of plies 402. Each of plurality of plies 502 corresponds to a ply of plurality of plies 402.

Plurality of plies 502 includes ply 504, ply 506, and ply 508. Ply 504, ply 506, and ply 508 have geometry constraints applied. Ply 504, ply 506, and ply 508 each contain rectangular patches as depicted. Ply 508 includes patch 510 and patch 512. Each of patch 510 and patch 512 is rectangular. Patch 510 and patch 512 have the same fiber angle.

During design, modified input model 500 is used as an input to a model generation system, such as model generation system 200 of FIG. 2. In some illustrative examples, the geometry constraints of the model generation system include only one mathematical function, for example, for rectangles. In other illustrative examples, the geometry constraints of the model generation system may include more than one mathematical function, for example, for rectangles and triangles.

FIG. 5B is a top view of modified input model 500. During the design process, the model generation system modifies dimensions of plurality of plies 502, but plurality of plies 502 maintains ply geometries that meet geometry constraints. For example, during the design process, plurality of plies 502 is kept rectangular, but the respective length and the respective width of each of plurality of plies 502 are variables.

For example, during the design process, width 514 and height 516 of patch 510 are variable. As another example, width 518 and height 520 of ply 506 are variable. In some illustrative examples, width 522 and height 524 of patch 512 are independent of width 514 and height 516 of patch 510. In other illustrative examples, design constraints, such as design constraints 256 of FIG. 2 include a symmetry constraint, such as symmetry 260. When a symmetry constraint exists, width 522 and width 514 will be the same throughout the design process.

Figure 6A:
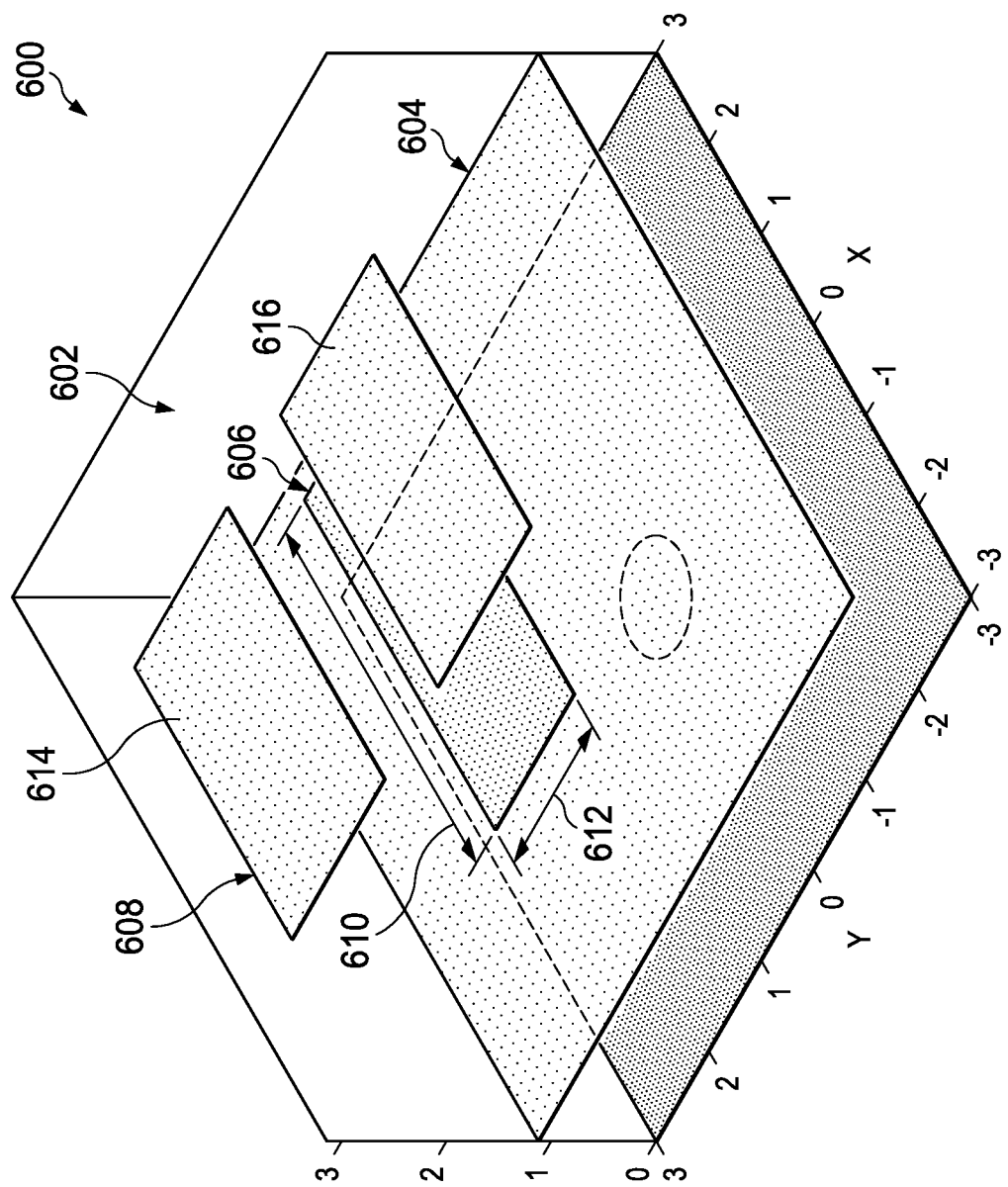
FIGS. 6A and 6B are an isometric view and a top view, respectively, of a model resulting from controlling a modified input model using a model generation system in accordance with an illustrative embodiment.
Figure 6B:
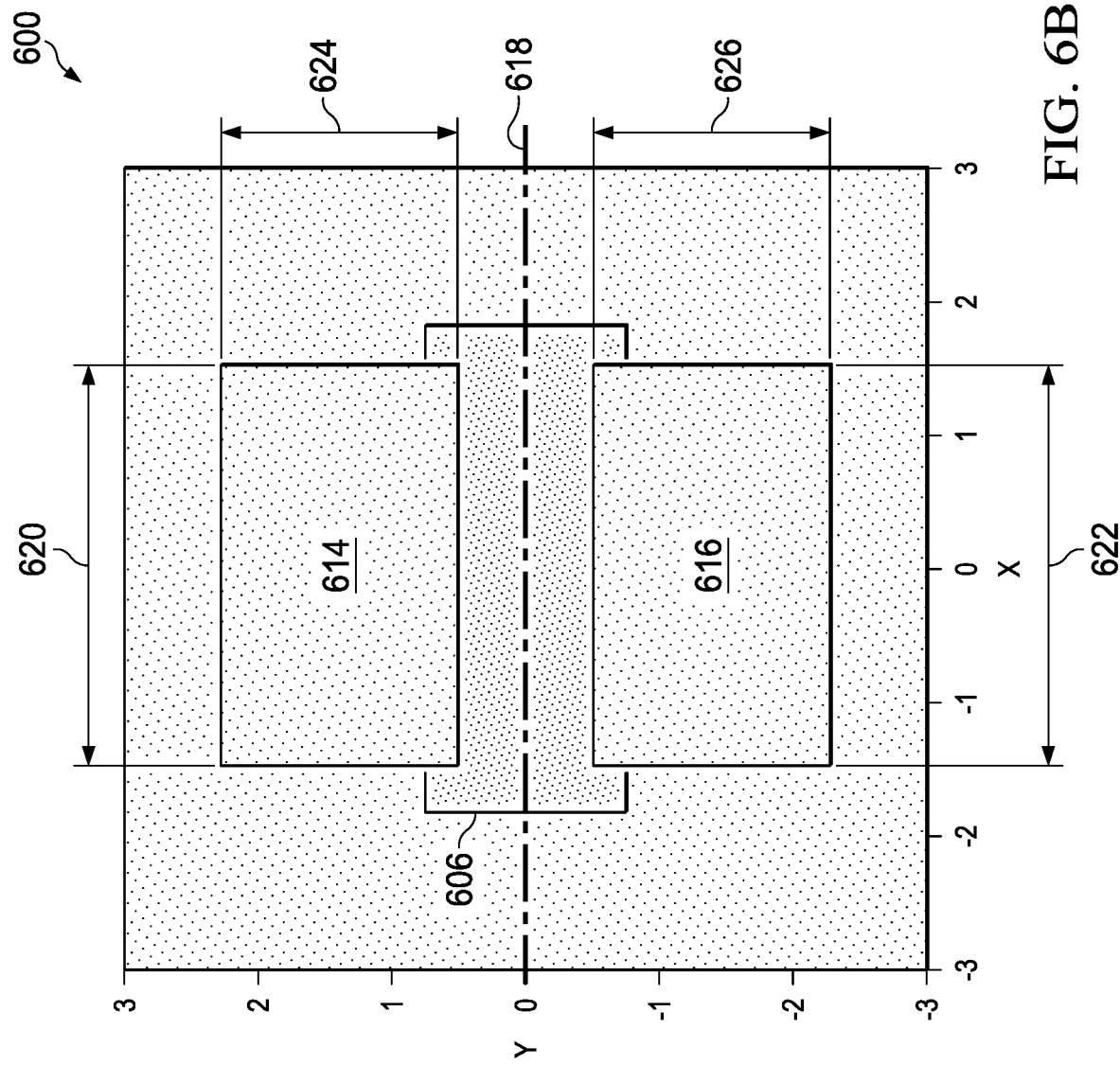

Turning now to FIGS. 6A and 6B, an isometric view and a top view, respectively, of a model resulting from controlling the modified input model using a model generation system are depicted in accordance with an illustrative embodiment. In some illustrative examples, model 600 in FIGS. 6A and 6B may be a final result after an iterative model modification process using a model generation system and an analyzer such as model generation system 200 of FIG. 2 and analyzer 206 of FIG. 2. In other illustrative examples, model 600 in FIGS. 6A and 6B may be an intermediate result during an iterative model modification process. When model 600 is an intermediate result, dimensions of plurality of plies 602 may be changed in later iterations to meet design parameters for the resulting laminated composite structure.

In some illustrative examples, modified input model 500 and model 600 are separate files. In other illustrative examples, model 600 may be an updated or modified version of modified input model 500.

As can be seen in FIG. 6A, plurality of plies 602 includes ply 604, ply 606, and ply 608. As depicted, ply 604 is the same size as ply 504 of FIGS. 5A and 5B. In some illustrative examples, the dimensions of ply 504 may be held constant as a design constraint.

As depicted, width 610 of ply 606 is less than width 518 of ply 506 and height 612 of ply 606 is less than height 520 of ply 506 of FIGS. 5A and 5B. By reducing the dimensions of ply 506 to the dimensions of ply 606, the volume of ply 506 is greater than volume of ply 606.

As can be seen when comparing FIG. 6B to FIG. 5B, patch 614 and patch 616 are smaller than patch 510 and patch 512 of ply 508 of FIGS. 5A and 5B.

As depicted, ply 608 is symmetrical about centerline 618 because patch 614 and patch 616 have substantially the same dimensions. As depicted, width 620 of patch 614 is substantially the same as width 622 of patch 616. Likewise, as depicted, height 624 of patch 614 is substantially the same as height 626 of patch 616.

As depicted, the volume of ply 608 is less than the volume of ply 508. Each of plurality of plies 602 is equal to or smaller than a respective ply of plurality of plies 502. The volume of plurality of plies 602 is less than the volume of plurality of plies 502. By reducing the volume of plurality of plies 602, the weight of a laminated composite structure formed based on model 600 is reduced.

In FIGS. 4-6B, the ply materials, fiber angles, and other material characteristics may be kept the same. In other illustrative example, the ply materials, fibers angles, or other features may be variables for the model modification process.

In FIGS. 4-6B, the quantity of plies remains the same. Plurality of plies 402, plurality of plies 502, and plurality of plies 602 each contain three plies. In other illustrative examples, the volume of the laminated composite structure changes. In these illustrative examples, the quantity of plies changes to reduce the volume of the laminated composite structure. Reducing the volume of a laminated composite structure in a model is illustrated in FIGS. 7-10. For example, the quantity of plies in plurality of plies 902 of FIG. 9 is greater than the quantity of plies in plurality of plies 1002 of FIG. 10 below.

Figure 7:
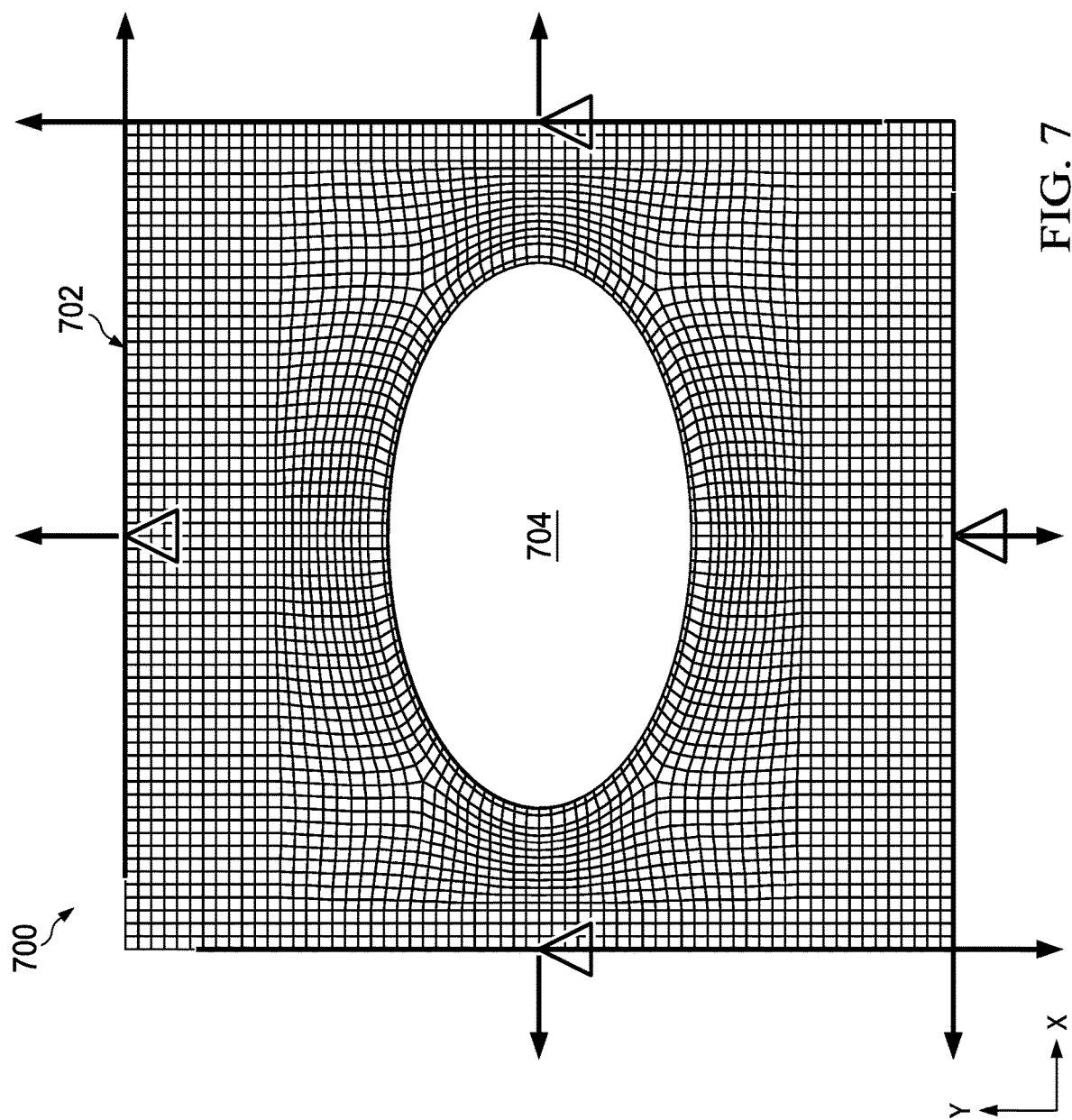
FIG. 7 is an illustration of a laminated composite structure in accordance with an illustrative embodiment.

Turning now to FIG. 7, an illustration of a laminated composite structure is depicted in accordance with an illustrative embodiment. Laminated composite structure 700 is an illustration of wing panel 702 with access hole 704. Laminated composite structure 700 is an example of laminated composite structure 276 of FIG. 2.

It is desirable to create a layup for laminated composite structure 700 that optimizes user defined design parameters, such as design parameters 262 of FIG. 2 while meeting design constraints, such as design constraints 256 of FIG. 2. For example, a user may indicate minimizing manufacturing cost as a user defined design parameter while maintaining strain below a set value. As another example, a user may indicate minimizing volume as a user defined design parameter while maintaining geometry constraints and maintaining strain below a set value.

Figure 8:
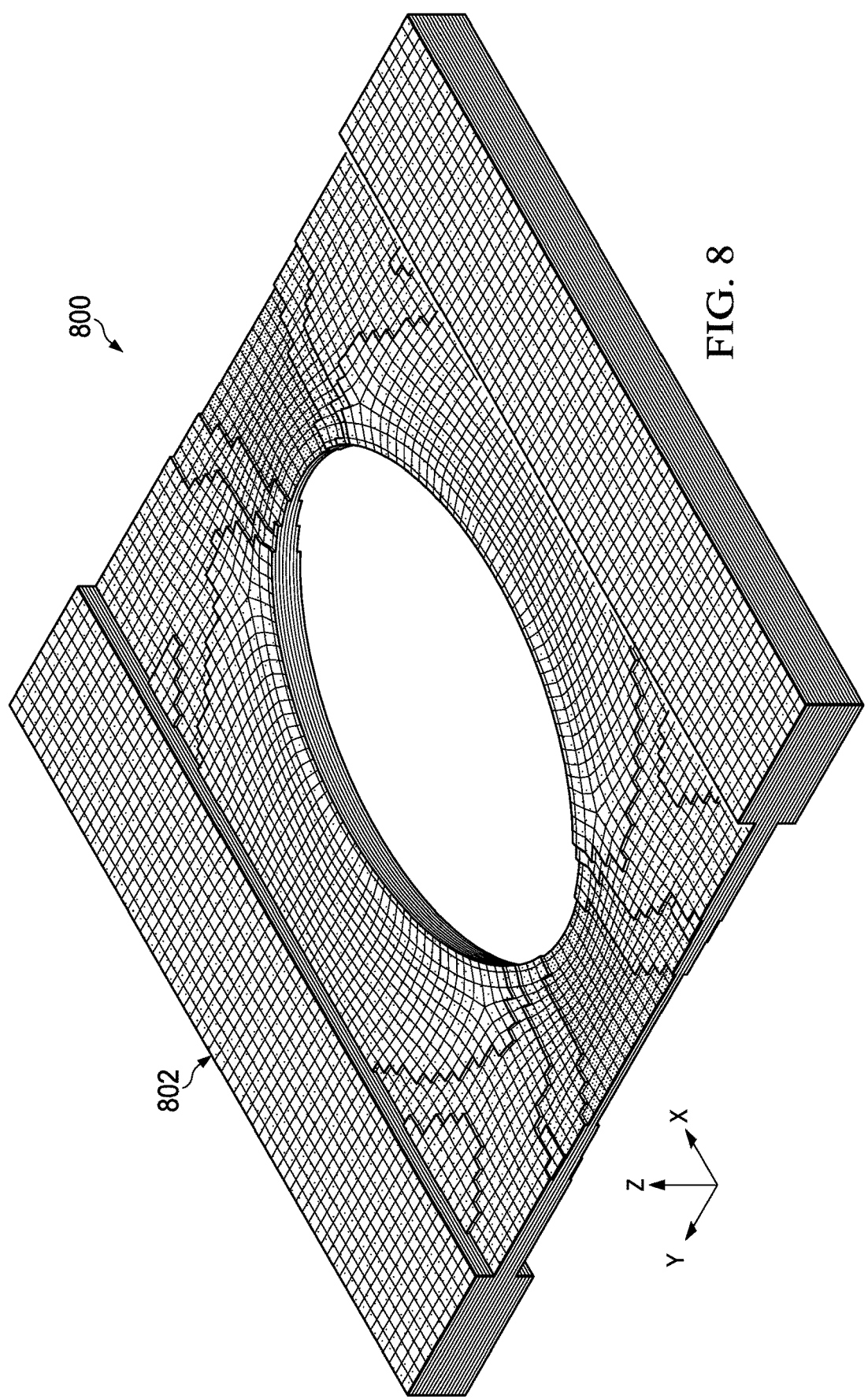
FIG. 8 is an illustration of an input model in accordance with an illustrative embodiment.
Figure 9:
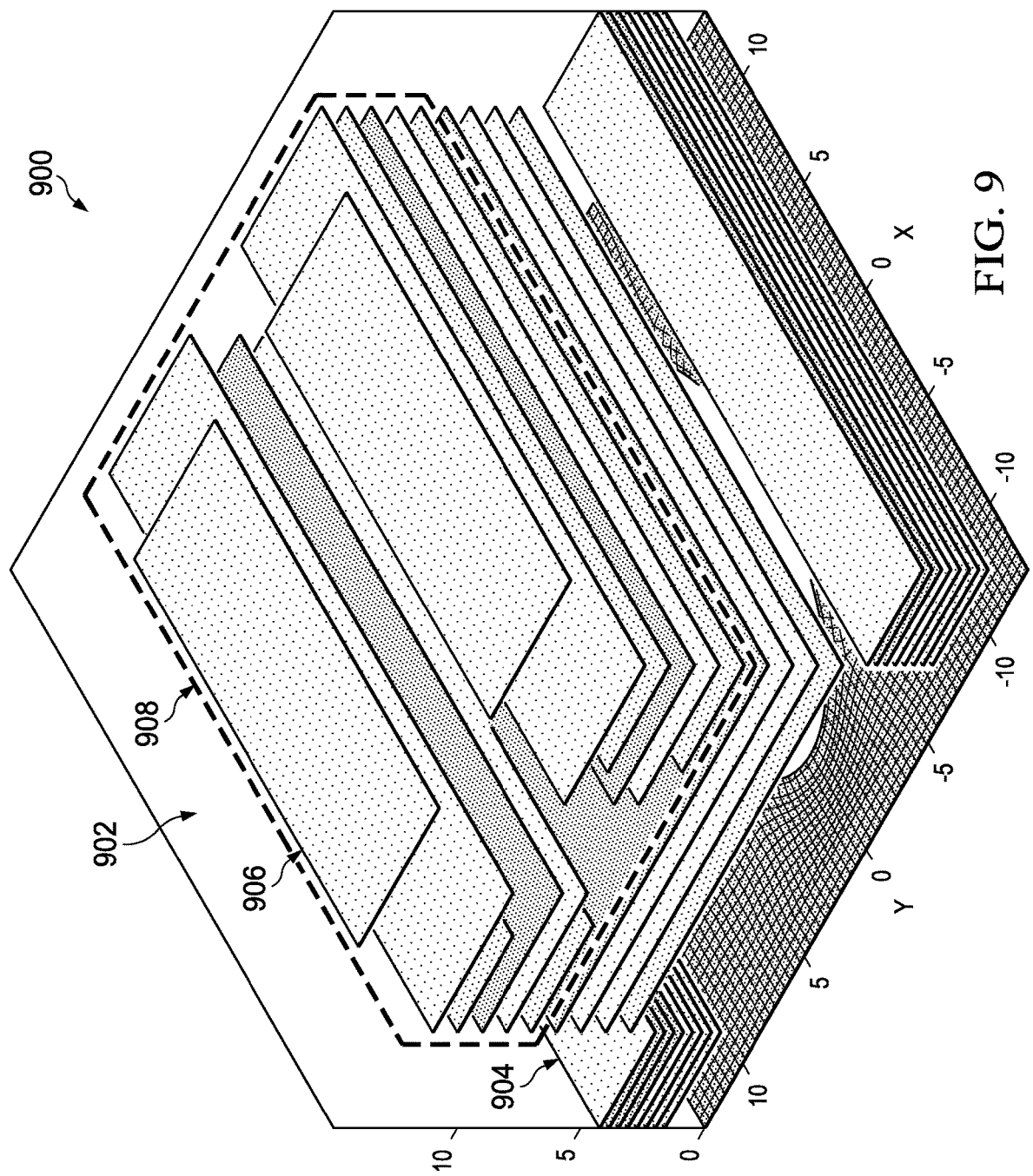
FIG. 9 is an isometric view of an input model modified for ply shape in accordance with an illustrative embodiment.

Turning now to FIG. 8, an illustration of an input model is depicted in accordance with an illustrative embodiment. Input model 800 is an implementation of input model 272 of FIG. 2. In some illustrative examples, input model 800 is manually generated by an operator based on the operator's experience and knowledge. In some illustrative examples, input model 800 is generated using a conventional finite element analysis.

Input model 800 is a model for laminated composite structure 700 of FIG. 7. Input model 800 has plurality of plies 802. Plurality of plies 802 includes greater than ten plies in this illustrative example. However, any desirable quantity of plies may be present in plurality of plies 802.

Each of plurality of plies 802 may include any desirable number of patches. In some illustrative examples, more than one ply of plurality of plies 802 has the same fiber angle.

As depicted, plurality of plies 802 has irregular geometries. For example, plies of plurality of plies 802 cannot be described as having a shape such as a rectangle, a triangle, a circle, an oval, a parallelogram, or other shape. Because of the irregular geometries of plurality of plies 802, manufacturing a laminated composite structure using input model 800 would be at least one of undesirably difficult, undesirably costly, or undesirably time consuming.

Further, input model 800 may not be optimized for desirable parameters. For example, at least one of a volume, a strain, a compliance, a course length, a quantity of plies, or other desirable parameters may not be a desirable value. Yet further, input model 800 may be designed to optimize a parameter other than a user desired parameter.

Turning now to FIG. 9, an isometric view of the input model modified for ply shape is depicted in accordance with an illustrative embodiment. FIG. 9 is an isometric view of modified input model 900. Modified input model 900 is input model 800 of FIG. 8 modified for ply shape. As depicted, modified input model 900 is a model for laminated composite structure 700 of FIG. 7.

Modified input model 900 has plurality of plies 902. Plurality of plies 902 has the same quantity of plies as plurality of plies 802 of FIG. 8. Each of plurality of plies 902 corresponds to a ply of plurality of plies 802.

Plurality of plies 902 includes plies 904 and plies 906. As depicted, each patch within plurality of plies 902 is rectangular. In this illustrative example, the dimensions of plies 906 are set as constraints. In this illustrative example, the dimensions of plies 904 are set as variables. Plies 904 are a subset of plurality of plies 902 within box 908. In this illustrative example, dimensions of plies 904 are variable, but geometry constraints are applied.

During a design process, modified input model 900 is used as an input to a model generation system, such as model generation system 200 of FIG. 2. In some illustrative examples, the geometry constraints of the model generation system include only one mathematical function for rectangles. In other illustrative examples, the geometry constraints of the model generation system may include more than one mathematical function, for example, for rectangles, parallelograms, and circles.

In FIG. 9, each of plurality of plies 902 is rectangular. However, in other illustrative examples, at least one ply of plurality of plies 902 has a different geometry. As depicted, plies 904 are within box 908. However, any desirable number of plies within plurality of plies 902 may be changed during the design process. In one illustrative example, the dimensions of each ply of plurality of plies 902 are variable. In other illustrative examples, fewer plies than plies 904 have dimensions that are variable.

Figure 10:
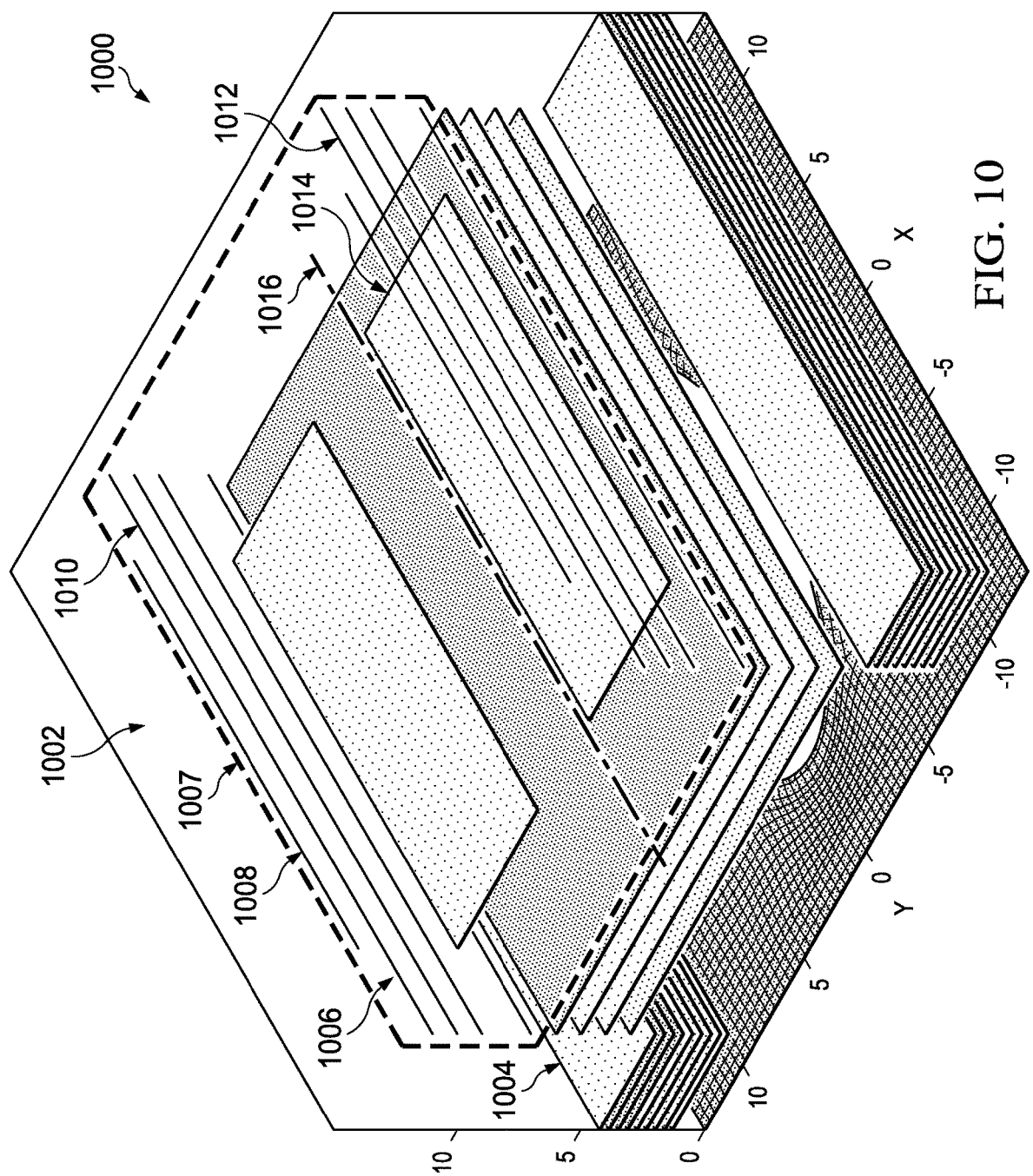
FIG. 10 is an isometric view of a model resulting from controlling a modified input model using a model generation system in accordance with an illustrative embodiment.

Turning now to FIG. 10, an isometric view of a model resulting from controlling the modified input model using a model generation system is depicted in accordance with an illustrative embodiment. In some illustrative examples, modified model 1000 in FIG. 10 may be a final result after an iterative model modification process using a model generation system and an analyzer such as model generation system 200 of FIG. 2 and analyzer 206 of FIG. 2. In other illustrative examples, modified model 1000 in FIG. 10 may be an intermediate result during an iterative model modification process. When modified model 1000 is an intermediate result, dimensions of plurality of plies 1002 may be changed in later iterations to meet design parameters for the resulting laminated composite structure.

In some illustrative examples, modified input model 900 of FIG. 9 and modified model 1000 are separate files. In other illustrative examples, modified model 1000 may be an updated or modified version of modified input model 900.

As can be seen in FIG. 10, plurality of plies 1002 includes plies 1004 and plies 1006. Plies 1004 are outside of box 1007. As depicted, plies 1004 are the same size as plies 904 of FIG. 9. In this illustrative example, the dimensions of plies 904 are held constant as a design constraint.

As depicted, dimensions of several of plies 1006 have been set to zero. Patch 1008, patch 1010, and patch 1012 are only a few of the patches that have been set to zero. By reducing the heights of several of plies 1006, the volume of plies 1006 is reduced. By reducing the height of a patch to zero, that patch is removed from modified model 1000. By removing all patches of a ply from modified model 1000, the corresponding ply is removed from modified model 1000. Reducing the quantity of plies in plurality of plies 1002 reduces the weight and volume of a laminated composite structure formed based on modified model 1000.

As depicted, all plies of plies 1006 other than ply 1014 have been reduced to zero. In this illustrative example, ply 1014 is symmetrical about centerline 1016.

In FIGS. 8-10, the ply materials, fiber angles, and other material characteristics may be kept the same. In other illustrative example, the ply materials, fibers angles, or other features may be variables for the model modification process. In FIGS. 8-10, the quantity of plies changes.

Figure 11:
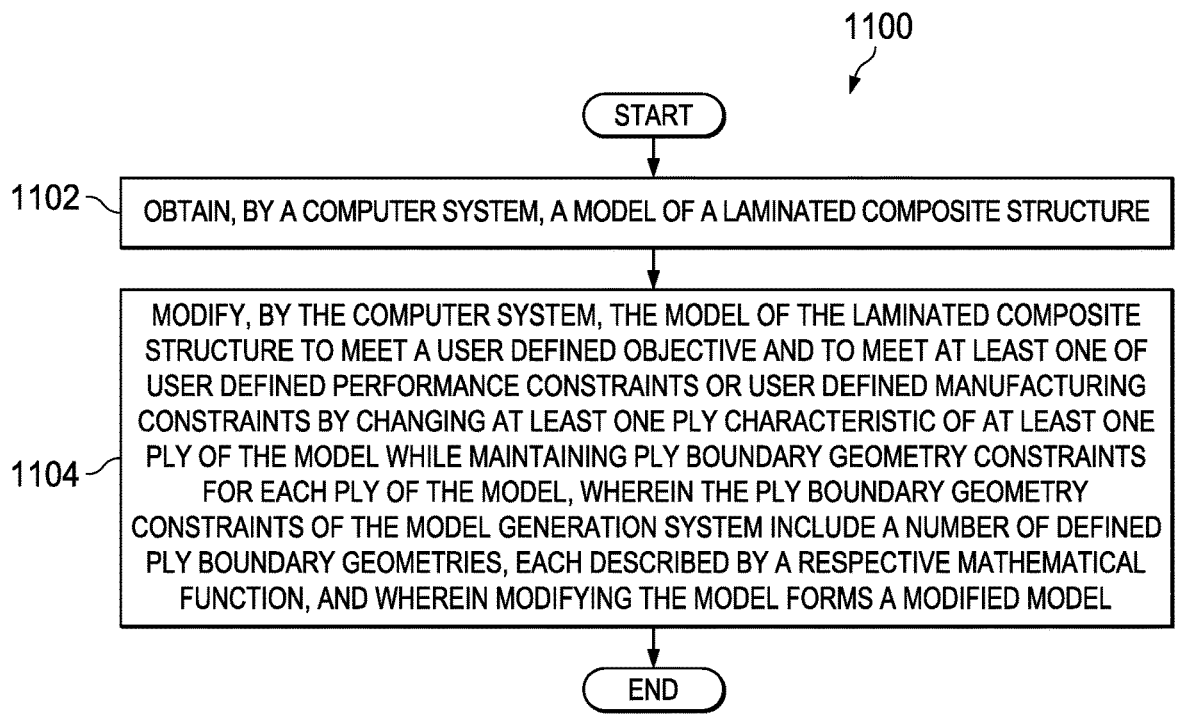
FIG. 11 is an illustration of a flowchart of a method for forming a modified model in accordance with an illustrative embodiment.

Turning now to FIG. 11, an illustration of a flowchart of a method for forming a modified model is depicted in accordance with an illustrative embodiment. Method 1100 may be used to form modified model 223 of FIG. 2. Method 1100 may be applied to modified input model 500 and model 600 of FIGS. 5A, 5B, 6A, and 6B. Method 1100 may be applied to modified input model 900 and modified model 1000 of FIGS. 9 and 10.

Method 1100 obtains, by a computer system, a model of a laminated composite structure (operation 1102). Method 1100 modifies, by the computer system, the model of the laminated composite structure to meet a user defined objective and to meet at least one of user defined performance constraints or user defined manufacturing constraints by modifying ply characteristics of the model while maintaining ply boundary geometry constraints for each ply of the model, wherein the ply boundary geometry constraints of the model generation system include a number of defined boundary geometries, each described by a respective mathematical function, and wherein modifying the model forms a modified model (operation 1104). Afterwards the process terminates.

In some illustrative examples, modifying the model of the laminated composite structure to meet the user defined objective comprises: modifying ply characteristics of the model to form a modified model; performing a finite element analysis on the modified model to produce at least one of objective values or constraint function values; and determining if an optimization of the model is complete using the at least one of objective values or constraint function values. In some illustrative examples, modifying the ply characteristics of the model comprises modifying the model iteratively in an optimization until the model meets the user defined objectives.

Figure 12:
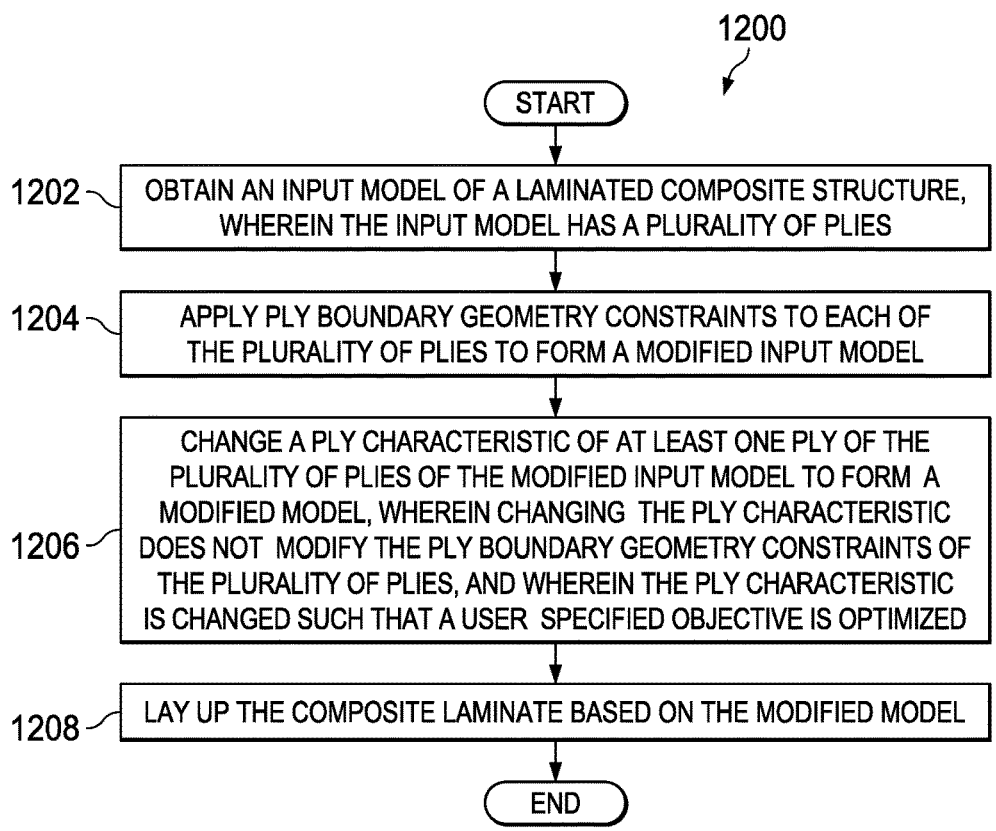
FIG. 12 is an illustration of a flowchart of a method for forming a laminated composite structure in accordance with an illustrative embodiment.

Turning now to FIG. 12, an illustration of a flowchart of a method for forming a laminated composite structure is depicted in accordance with an illustrative embodiment.

Method 1200 may be used to form laminated composite structure 300 of FIG. 3 or laminated composite structure 700 of FIG. 7.

Method 1200 obtains an input model of a laminated composite structure, wherein the input model has a plurality of plies (operation 1202). The input model may be input model 272 of FIG. 2. Input model 400 of FIG. 4 may be a graphical depiction of the input model. Input model 800 of FIG. 8 may be a graphical depiction of the input model Method 1200 applies ply boundary geometry constraints to each of the plurality of plies to form a modified input model (operation 1204). In some illustrative examples, the ply boundary geometry constraints include a number of defined boundary geometries, each described by a respective mathematical function.

The modified input model may be modified input model 274 of FIG. 2. The modified input model may be modified input model 500 of FIGS. 5A and 5B. The modified model may be modified input model 900 of FIG. 9. In some illustrative examples, applying ply boundary geometry constraints to each of the plurality of plies modifies ply shape of at least one ply of the plurality of plies, such that the at least one ply has at least one of a more manufacturable shape, a smaller boundary, or a less complex boundary.

Method 1200 changes a ply characteristic of at least one ply of the plurality of plies of the modified input model to form a modified model, wherein changing the ply characteristic does not modify the ply boundary geometry constraints of the plurality of plies, and wherein the ply characteristic is changed such that a user specified objective is optimized (operation 1206). In this illustrative example, modified input model may be model 208 of FIG. 2. The modified model may be modified model 223 of FIG. 2. The modified input model may be modified input model 500 of FIGS. 5A and 5B. Method 1200 may be applied to modified input model 900 and modified model 1000 of FIGS. 9 and 10.

Method 1200 lays up the laminated composite structure based on the modified model (operation 1208). Afterwards, the process terminates.

The flowcharts and block diagrams in the different depicted embodiments illustrate the architecture, functionality, and operation of some possible implementations of apparatus and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added, in addition to the illustrated blocks, in a flowchart or block diagram.

In some illustrative examples, the user defined objective is a first user defined objective, and modifying the model of the laminated composite structure to meet the user defined objective forms a first modified model. In these illustrative examples, method 1100 may further comprise modifying, by the computer system, the first modified model to meet a second user defined objective and to meet the at least one of the user defined performance constraints or the user defined manufacturing constraints by modifying at least one ply characteristic of at least one ply of the first modified model while maintaining ply boundary geometry constraints for each ply of the first modified model, and wherein modifying the first modified model forms a second modified model. In some illustrative examples, method 1100 further comprises forming the laminated composite structure based on the modified model. Method 1100 may form the laminated composite structure directly using the modified model or using a later model based on the modified model. For example, when method 1100 comprises modifying the first modified model, method 1100 may further comprise forming the laminated composite structure based on the second modified model.

In some illustrative examples, method 1200 further comprises applying loads to a known part shape, and optimizing ply shapes of the known part shape to minimize volume and maintain strain below a set amount using a finite element analysis, to form the input model. In some illustrative examples, method 1200 further comprises identifying ply characteristics that are variable, and identifying ply characteristics that are fixed. In some illustrative examples, ply characteristics for a subset of the plurality of plies are fixed.

In some illustrative examples, in method 1200, changing a ply characteristic of at least one ply of the plurality of plies of the modified input model to form a modified model comprises modifying ply characteristics of the modified input model to minimize volume of the model while keeping strain of the model below a constraint and maintaining ply boundary geometry constraints for each ply of the modified input model, and modifying ply characteristics of the modified input model to minimize one of manufacturing cost or boundary length.

Figure 13:
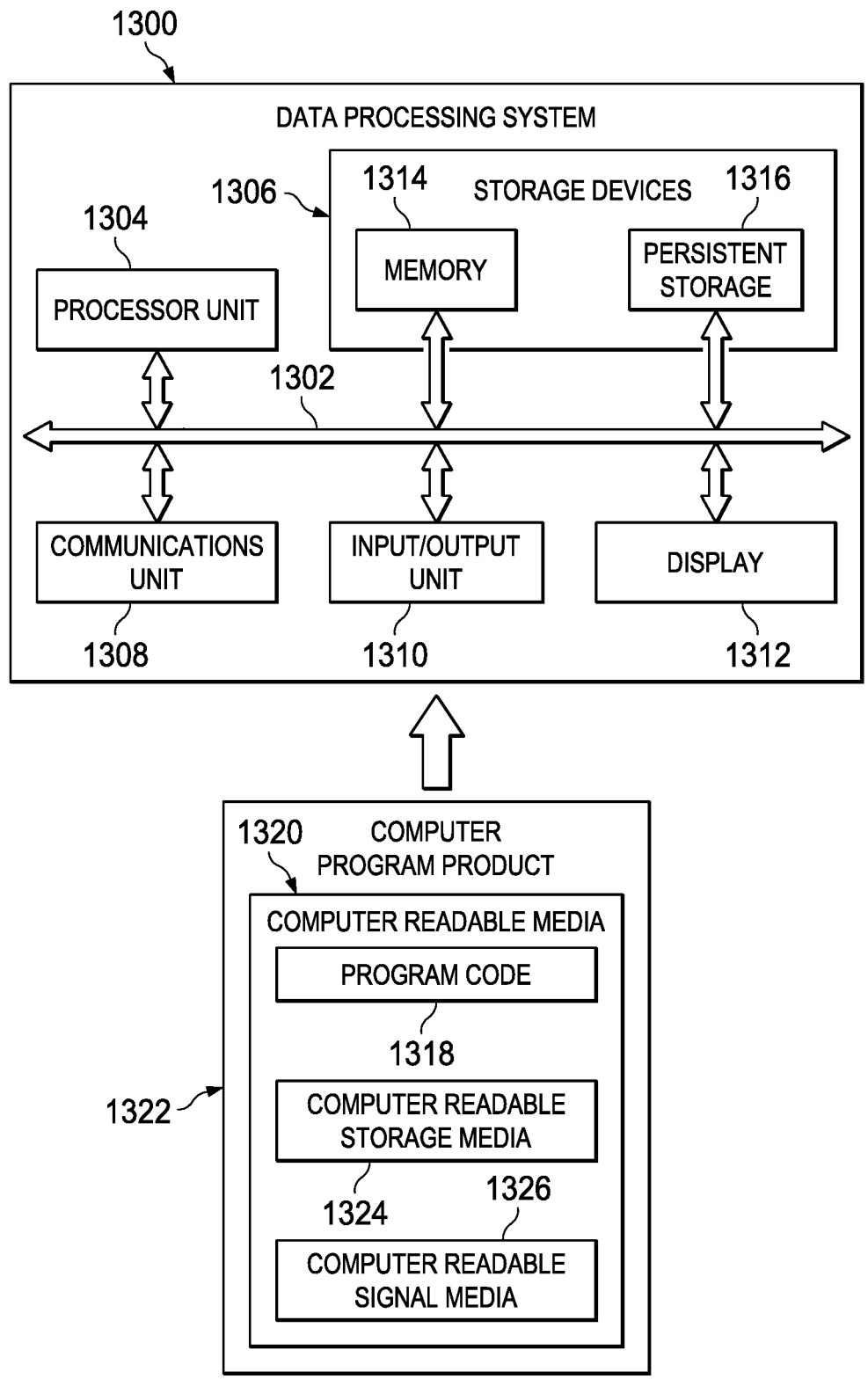
FIG. 13 is an illustration of a data processing system in a form of a block diagram in accordance with an illustrative embodiment.

Turning now to FIG. 13, an illustration of a data processing system in the form of a block diagram is depicted in accordance with an illustrative embodiment. Data processing system 1300 may be used to implement computer system 202 of FIG. 2. As depicted, data processing system 1300 includes communications framework 1302, which provides communications between processor unit 1304, storage devices 1306, communications unit 1308, input/output unit 1310, and display 1312. In some cases, communications framework 1302 may be implemented as a bus system.

Processor unit 1304 is configured to execute instructions for software to perform a number of operations. Processor unit 1304 may comprise a number of processors, a multi-processor core, and/or some other suitable type of processor, depending on the implementation. In some cases, processor unit 1304 may take the form of a hardware unit, such as a circuit system, an application specific integrated circuit (ASIC), a programmable logic device, or some other suitable type of hardware unit.

Instructions for the operating system, applications, and/or programs run by processor unit 1304 may be located in storage devices 1306. Storage devices 1306 may be in communication with processor unit 1304 through communications framework 1302. As used herein, a storage device, also referred to as a computer-readable storage device, is any piece of hardware capable of storing information on a temporary and/or permanent basis. This information may include, but is not limited to, data, a program code, and/or other types of information.

Memory 1314 and persistent storage 1316 are examples of storage devices 1306. Memory 1314 may take the form of, for example, a random access memory or some type of volatile or non-volatile storage device. Persistent storage 1316 may comprise any number of components or devices. For example, persistent storage 1316 may comprise a hard drive, a flash memory drive, a rewritable optical disk, a rewritable magnetic tape, or some combination of the above. The media used by persistent storage 1316 may or may not be removable.

Communications unit 1308 allows data processing system 1300 to communicate with other data processing systems and/or devices. Communications unit 1308 may provide communications using physical and/or wireless communications links.

Input/output unit 1310 allows input to be received from, and output to be sent to other devices connected to data processing system 1300. For example, input/output unit 1310 may allow user input to be received through a keyboard, a mouse, and/or some other type of input device. As another example, input/output unit 1310 may allow output to be sent to a printer connected to data processing system 1300.

Display 1312 is configured to display information to a user. Display 1312 may comprise, for example, without limitation, a monitor, a touch screen, a laser display, a holographic display, a virtual display device, and/or some other type of display device.

In this illustrative example, the processes of the different illustrative embodiments may be performed by processor unit 1304 using computer-implemented instructions. These instructions may be referred to as a program code, a computer-usable program code, or a computer-readable program code, and may be read and executed by one or more processors in processor unit 1304.

In these examples, program code 1318 is located in a functional form on computer-readable media 1320, which is selectively removable, and may be loaded onto or transferred to data processing system 1300 for execution by processor unit 1304. Program code 1318 and computer-readable media 1320 together form computer program product 1322. In this illustrative example, computer-readable media 1320 may be computer-readable storage media 1324 or computer-readable signal media 1326.

Computer-readable storage media 1324 is a physical or tangible storage device used to store program code 1318, rather than a medium that propagates or transmits program code 1318. Computer-readable storage media 1324 may be, for example, without limitation, an optical or magnetic disk, or a persistent storage device that is connected to data processing system 1300.

Alternatively, program code 1318 may be transferred to data processing system 1300 using computer-readable signal media 1326. Computer-readable signal media 1326 may be, for example, a propagated data signal containing program code 1318. This data signal may be an electromagnetic signal, an optical signal, and/or some other type of signal that can be transmitted over physical and/or wireless communications links.

The illustration of data processing system 1300 in FIG. 13 is not meant to provide architectural limitations to the manner in which the illustrative embodiments may be implemented. The different illustrative embodiments may be implemented in a data processing system that includes components, in addition to or in place of those illustrated, for data processing system 1300. Further, components shown in FIG. 13 may be varied from the illustrative examples shown.

Figure 14:
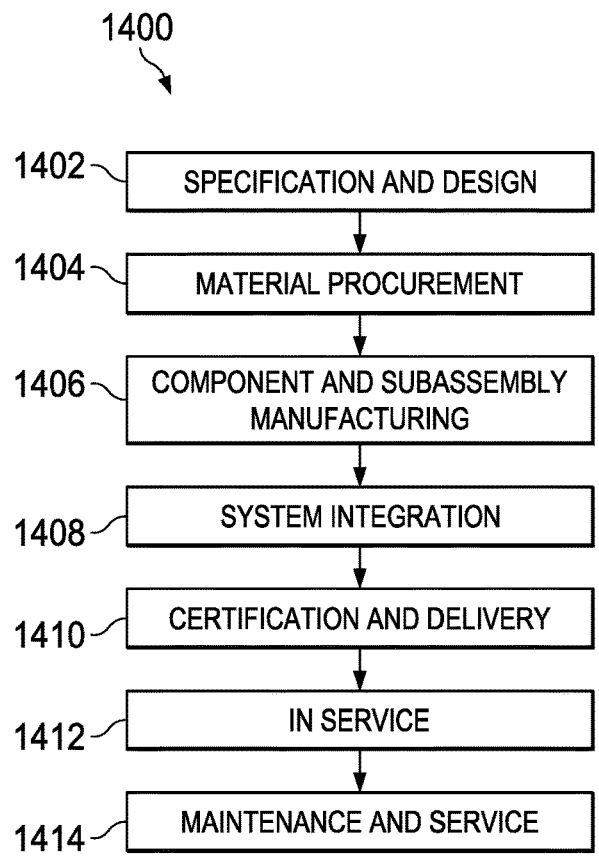
FIG. 14 is an illustration of an aircraft manufacturing and service method in a form of a block diagram in accordance with an illustrative embodiment.
Figure 15:
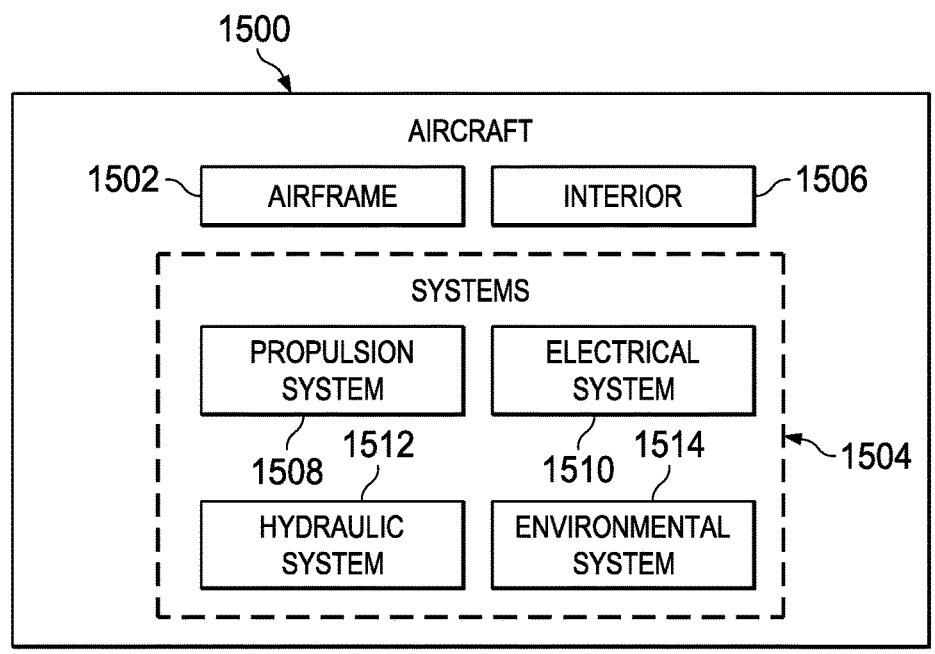
FIG. 15 is an illustration of an aircraft in a form of a block diagram in which an illustrative embodiment may be implemented.

Illustrative embodiments of the present disclosure may be described in the context of aircraft manufacturing and service method 1400 as shown in FIG. 14 and aircraft 1500 as shown in FIG. 15. Turning first to FIG. 14, an illustration of an aircraft manufacturing and service method is depicted in accordance with an illustrative embodiment. During pre-production, aircraft manufacturing and service method 1400 may include specification and design 1402 of aircraft 1500 in FIG. 15 and material procurement 1404.

During production, component and subassembly manufacturing 1406 and system integration 1408 of aircraft 1500 takes place. Thereafter, aircraft 1500 may go through certification and delivery 1410 in order to be placed in service 1412. While in service 1412 by a customer, aircraft 1500 is scheduled for routine maintenance and service 1414, which may include modification, reconfiguration, refurbishment, or other maintenance and service.

Each of the processes of aircraft manufacturing and service method 1400 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 15, an illustration of an aircraft is depicted in which an illustrative embodiment may be implemented. In this example, aircraft 1500 is produced by aircraft manufacturing and service method 1400 in FIG. 14 and may include airframe 1502 with plurality of systems 1504 and interior 1506. Examples of systems 1504 include one or more of propulsion system 1508, electrical system 1510, hydraulic system 1512, and environmental system 1514. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1400. As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, "at least one of item A, item B, or item C" may include, without limitation, item A, item A and item B, or item B. This example also may include item A, item B, and item C or item B and item C. Of course, any combination of these items may be present. In other examples, "at least one of" may be, for example, without limitation, two of item A, one of item B, and ten of item C; four of item B and seven of item C; or other suitable combinations.

One or more illustrative embodiments may be used during component and subassembly manufacturing 1406 of FIG. 14. For example, laminated composite structure 276 of FIG. 2 may be manufactured during component and subassembly manufacturing 1406. Laminated composite structure 276 of FIG. 2 may be designed during specification and design 1402 using method 1100 of FIG. 11 or method 1200 of FIG. 12. A laminated composite structure formed using a modified model, such as modified model 223 of FIG. 2, may replace a previous component during maintenance and service 1414 of FIG. 14.

The illustrative examples provide a method and apparatus for designing a composite structure taking into account manufacturing constraints. Further, the illustrative examples provide a method and apparatus for designing a composite structure with controlled ply shapes.

The illustrative examples directly control and adjust ply shapes of the laminated composite structures to satisfy both performance and manufacturing requirements. Existing solutions either involve manual manipulation of the ply shapes, which is time consuming and relies on engineering judgment to come up with the well-performing structure, or involve the finite element based solution that accounts for stiffness of the structure only and disregards manufacturability, efficiency, cost, and performance.

The illustrative examples operate directly with ply shape boundaries that are described using mathematical functions. Examples of such shape boundaries may be a rectangle, ellipsoid, or any other geometry described by mathematical expressions (splines, for example). The ply boundaries are automatically adjusted via optimization techniques to better meet the requirements specified by engineer. Margin checks for stress, strain, buckling, in addition to cost and manufacturing constraints are also considered. Thus, an engineer may choose any ply shape manufacturability considerations and then adjust the corresponding dimensions using the design process developed in these illustrative examples. The existing methods in practice today require manual operation with limited success and much time and effort with the final design that may not satisfy both performance and manufacturing constraints.

The illustrative examples enable integration of manufacturing requirements into the design process at an early stage, in contrast to the common practice of adjusting the design for manufacturing requirements at later design stages, which is cost prohibitive.

These illustrative examples use both a finite element strain analyzer and an optimization solver at the same time. The finite element solver suggests a ply thickness to keep strain under a threshold. A user then modifies the suggested plies to a shape that can be manufactured. The finite element solver modifies the plies again for minimum volume and a strain less than a threshold. The threshold is selected based on the ply material as well as part's design and desired use. Plies are then put into a model generation system to optimize any criteria and keep strain less than a threshold. The threshold may be adjusted if needed. Specifically, due to robustness of the model generation system the threshold may be adjusted to a stricter value. One example of a model generation system includes a MATLAB script. The results are then put into FEA software to check strains.

Commercial software does not allow a user to adjust a ply shape. This method gives the user the control and opportunity to control the ply shapes. A user can pick rectangular shapes or ellipsoid, or any other geometry described by mathematical expressions. This method also factors in stress and load distribution. One example of a finite element analysis is OptiStruct. However, the illustrative examples need not use a commercially available finite element analysis. The analyzer could be created from scratch. Alternatively, any commercial finite element model software can be used.

The better the first guess/model, the faster the solution. Commercial software gets you a good best guess. Then a user may manually change the model to plies of a known thickness. The model generation system is given the ply shape in the form of an array and is optimized on performance (weight, cost, strain). Then the model is sent back to the finite element analysis to analyze the strength of new plies.

For manufacturing, the model can be optimized to make cost a factor based on the length of the boundary. It gives the designer the option of what plies he wants to design and gives control of the shape of the final plies. With this tool a user can look at non-traditional laminates, as there is no constraint for ply angle. FEM software can be set to make the plies symmetric and balanced.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer system comprising:
    a model generation system configured to modify an input model of a laminated composite structure to meet a user defined objective and user defined constraints while changing a ply shape of at least one ply of the input model to conform to ply boundary geometry constraints for each ply of a modified model of the laminated composite structure, wherein the ply boundary geometry constraints correspond to a number of defined ply boundary geometries suitable for each ply of the modified model where each of the number of defined ply boundary geometries is described by a respective mathematical function; and
    an analyzer configured to return data for use by the model generation system to determine when an optimization of the user defined objective is complete for the modified model.

2. The system of claim 1, wherein one of the defined ply boundary geometries comprises a rectangular shape.

3. The system of claim 1, wherein the user defined objective includes minimizing at least one of a volume, a boundary length, a manufacturing cost, or a manufacturing time.

4. The system of claim 1, wherein the user defined constraints include at least one of a maximum strain, a stability of the laminated composite structure, a resistance to strikes on the laminated composite structure, maximum stress, far field stress, large notch failure load, structure stiffness, or structure strength.

5. The system of claim 1, wherein the user defined constraints include at least one of a boundary length, a manufacturing cost, or a manufacturing time.

6. The system of claim 1, wherein at least one ply of the modified model is further constrained by at least one of a fiber angle, a ply location, or a ply size.

7. The system of claim 1 further comprising:
    an automated fiber placement head configured to form the laminated composite structure based on the modified model.

8. The system of claim 1, wherein the user defined objective includes strain information.

9. A method comprising:
    obtaining, by a computer system, an input model of a laminated composite structure;
    modifying, by the computer system, the input model of the laminated composite structure to meet a user defined objective and user defined manufacturing constraints while changing a ply shape of at least one ply of the input model to conform to ply boundary geometry constraints for each ply of a modified model of the laminated composite structure, wherein the ply boundary geometry constraints include a number of defined ply boundary geometries suitable for each ply of the modified model where each of the number of defined ply boundary geometries is described by a respective mathematical function;

performing a finite element analysis, by an analyzer of the computer system, to determine when an optimization of the user defined objective and user defined manufacturing constraints are complete for the modified model; and forming the laminated composite structure based on the modified model.

10. The method of claim 9, wherein the modifying comprises:
modifying iteratively until the modified model meets the user defined objective.

11. The method of claim 9, further comprising:
modifying, by the computer system, the input model by changing at least one ply characteristic of at least one ply of the input model while maintaining the ply boundary geometry constraints for each ply of the modified model.

12. The method of claim 9 further comprising:
forming the laminated composite structure with an automated fiber placement head.

13. A computer system for optimizing a design of laminated composite structures, comprising:
a model generation system configured to modify an input model of a laminated composite structure to meet a design parameter while changing a ply shape of at least one ply of the input model from an irregular ply shape to conform to one of a number of defined ply shapes utilized as constraints for each ply of a modified model of the laminated composite structure, wherein each defined ply shape of the number of defined ply shapes is defined by a respective mathematical function and the irregular ply shape is not one of the number of defined ply shapes; and
an analyzer configured to return data for use by the model generation system to determine when an optimization of the design parameter is complete for the modified model.

14. The system of claim 13, wherein the design parameter includes minimizing at least one of a volume, a boundary length, a manufacturing cost, or a manufacturing time.

15. The system of claim 13, wherein the design parameter includes at least one of a maximum strain, a stability of the laminated composite structure, a resistance to strikes on the laminated composite structure, a maximum stress, a far field stress, a large notch failure load, a structure stiffness, or a structure strength.

16. The system of claim 13, wherein at least one ply of the modified model is further constrained by at least one of a fiber angle, a ply location, or a ply size.

17. The system of claim 13, wherein the defined ply shapes include a rectangle, an ellipse, an oval, a spline, or a triangle.

18. The system of claim 13, further comprising:
an automated fiber placement head configured to form the laminated composite structure based on the modified model.

19. The system of claim 13, wherein the model generation system is configured to modify iteratively until the modified model meets the design parameter.

20. The system of claim 13, wherein the design parameter requires each ply of the modified model to be symmetric about a center of the laminated composite structure.

* * * * *